(12) United States Patent
Byun et al.

(10) Patent No.: US 10,809,559 B2
(45) Date of Patent: Oct. 20, 2020

(54) LIQUID CRYSTAL DISPLAY DEVICE AND METHOD OF FABRICATING THE SAME

(71) Applicant: LG DISPLAY CO., LTD., Seoul (KR)

(72) Inventors: Woo-Jung Byun, Paju-si (KR); Tae-Young Kim, Paju-si (KR); Hyo-Jong Yi, Paju-si (KR); Dong-In Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 189 days.

(21) Appl. No.: 14/287,990

(22) Filed: May 27, 2014

(65) Prior Publication Data

US 2014/0354924 A1 Dec. 4, 2014

(30) Foreign Application Priority Data

May 31, 2013 (KR) .................... 10-2013-0062593

(51) Int. Cl.
*G02F 1/1339* (2006.01)
*G02F 1/1362* (2006.01)
*G02F 1/1335* (2006.01)
*G02F 1/1333* (2006.01)
*G02F 1/1343* (2006.01)

(52) U.S. Cl.
CPC .... *G02F 1/133514* (2013.01); *G02F 1/13394* (2013.01); *G02F 1/134363* (2013.01); *G02F 2001/13398* (2013.01); *G02F 2001/133357* (2013.01); *G02F 2001/136222* (2013.01); *G02F 2201/52* (2013.01)

(58) Field of Classification Search
None
See application file for complete search history.

(56) References Cited

U.S. PATENT DOCUMENTS 5,757,451 A * 5/1998 Miyazaki ............ G02F 1/13394
349/106
5,815,232 A * 9/1998 Miyazaki .......... G02F 1/133514
349/106

(Continued)

FOREIGN PATENT DOCUMENTS

CN 102914922 A 2/2013
KR 10-2001-0083106 A 8/2001

(Continued)

*Primary Examiner* — Jessica M Merlin
*Assistant Examiner* — Mark D Teets
(74) *Attorney, Agent, or Firm* — Dentons US LLP

(57) ABSTRACT

Disclosed is a liquid crystal display device that includes: first and second substrates; a gate line and a data line on the first substrate, the gate line and the data line crossing each other to define a pixel region; a thin film transistor connected to the gate line and the data line; a color filter layer on the thin film transistor, the color filter layer including red, green and blue color filters each corresponding to the pixel region; a protrusion pattern at a boundary of the pixel region, the protrusion pattern including at least two of the red, green and blue color filters; a pixel electrode on the color filter layer; a first alignment layer on the pixel electrode; a first patterned spacer on the second substrate, the first patterned spacer contacting the first alignment layer over the protrusion pattern; and a liquid crystal layer between the first and second substrates.

19 Claims, 15 Drawing Sheets

(56) References Cited

U.S. PATENT DOCUMENTS

| | | | |
|---|---|---|---|
| 6,097,467 A * | 8/2000 | Fujimaki | G02F 1/13394 349/141 |
| 6,275,280 B1 * | 8/2001 | Kajita | G02F 1/13394 349/106 |
| 2001/0026347 A1 * | 10/2001 | Sawasaki | G02F 1/133707 349/156 |
| 2004/0195573 A1 * | 10/2004 | Kim | G02F 1/136227 257/72 |
| 2005/0123861 A1 * | 6/2005 | Takagi | G02F 1/1393 430/321 |
| 2005/0140889 A1 * | 6/2005 | Chae | G02F 1/133345 349/139 |
| 2005/0270472 A1 * | 12/2005 | Yamada | G02F 1/13394 349/156 |
| 2008/0266498 A1 * | 10/2008 | Kim | G02F 1/13394 349/110 |
| 2010/0002172 A1 * | 1/2010 | Kim | G02F 1/13394 349/106 |
| 2013/0003008 A1 * | 1/2013 | Okumoto | G02F 1/133514 349/155 |
| 2013/0033654 A1 * | 2/2013 | Kim | G02F 1/133509 349/38 |
| 2014/0118666 A1 * | 5/2014 | Lee | G02F 1/13394 349/106 |

FOREIGN PATENT DOCUMENTS

| | | |
|---|---|---|
| KR | 10-2013-0015733 A | 2/2013 |
| TW | 513683 B | 12/2002 |

* cited by examiner

LIQUID CRYSTAL DISPLAY DEVICE AND METHOD OF FABRICATING THE SAME

CROSS REFERENCE TO RELATED APPLICATIONS

This present application claims the benefit of priority of Korean Patent Application No. 10-2013-0062593 filed in the Republic of Korea on May 31, 2013, which is hereby incorporated by reference in its entirety for all purposes as if fully set forth herein.

FIELD OF THE DISCLOSURE

The present disclosure relates to a liquid crystal display device. More specifically, the present disclosure relates to a liquid crystal display device in which aperture ratio is increased by omitting a black matrix, light leakage adjacent to a patterned spacer is prevented, and a method of fabricating the liquid crystal display device.

DISCUSSION OF THE RELATED ART

Recently, liquid crystal display (LCD) devices have been in the spotlight as a next generation display device because the LCD device has high value added due to its low-power consumption and good portability.

In general, the LCD device may be driven based on optical anisotropy and polarization of liquid crystal (LC) molecules. Since LC molecules are thin and long, the LC molecules may be arranged in a specific direction, and the direction in which the LC molecules are arranged may be controlled by artificially applying an electric field to the LC molecules. As a result, when the arrangement of the LC molecules is changed using the electric field, light may be refracted due to the optical anisotropy of the LC molecules in the direction in which the LC molecules are arranged so that images can be displayed.

In recent years, an active-matrix LCD (AM-LCD) device in which thin film transistors (TFTs) and pixel electrodes are arranged in matrix shapes has attracted much attention because the device has a high resolution and is highly capable of embodying moving images.

FIG. 1 is a cross-sectional view showing a liquid crystal display device according to the related art, and FIG. 2 is a magnified view showing a portion A of FIG. 1.

In FIG. 1, a liquid crystal display (LCD) device 1 includes an array substrate 10 and a color filter substrate 20 facing and spaced apart from each other and a liquid crystal layer 30 interposed between the array substrate 10 and the color filter substrate 20.

A plurality of gate lines (not shown) and a plurality of data lines 16 are formed on an inner surface of the array substrate 10. The plurality of gate lines cross the plurality of data lines 16 to define a plurality of pixel regions P. A gate insulating layer 14 is formed between the plurality of gate lines and the plurality of data lines 16 and a thin film transistor (TFT) (not shown) is connected to the gate line and the data line 16. A passivation layer 17 is formed on the TFT and a pixel electrode 18 is formed on the passivation layer 17. The pixel electrode 18 is connected to a drain electrode of the TFT.

A black matrix 24 is formed on an inner surface of the color filter substrate 20. The black matrix 24 corresponds to the plurality of gate lines, the plurality of data lines and the TFT to have a lattice shape surrounding in each pixel region P. A color filter layer 26 including red, green and blue color filters 26a is formed on the black matrix 24 and a common electrode 28 is formed on the color filter layer 26. The red, green and blue color filters 26a are sequentially and repeatedly disposed to correspond to the plurality of pixel regions P. In addition, a patterned spacer 40 having a columnar shape is formed on the common electrode 28 to correspond to a boundary of each pixel region P.

A seal pattern (not shown) for preventing leakage of the liquid crystal layer 30 is formed in a non-display area (not shown) surrounding a display area AA. A first alignment layer (not shown) is formed between the liquid crystal layer 30 and the array substrate 10 and a second alignment layer (not shown) is formed between the liquid crystal layer 30 and the color filter substrate 20 to provide an initial alignment state to liquid crystal molecules of the liquid crystal layer 30. In addition, a first polarizing plate (not shown) is formed on an outer surface of the array substrate 10 and a second polarizing plate (not shown) is formed on an outer surface of the color filter substrate 20. A backlight unit (not shown) is disposed under the array substrate 10 to provide a light.

When the TFTs are sequentially turned on by a gate signal through the plurality of gate lines, a data signal through the plurality of data lines 16 is sequentially applied to the pixel electrode 18 of the pixel region P. As a result, the liquid crystal molecules of the liquid crystal layer 30 are rearranged according to a vertical electric field generated between the pixel electrode 18 and the common electrode 28 and transmittance of the liquid crystal layer 30 is changed to display an image.

In FIG. 2, when an exterior pressure is applied to the LCD device 1, the patterned spacer 40 may be shifted and the first alignment layer may be deteriorated due to the shift of an end portion of the patterned spacer 40. A light may be normally or obliquely incident to a deteriorated portion of the first alignment layer from the backlight unit. As a result, light leakage may be caused through the deteriorated portion of the first alignment layer by the normally or obliquely incident light. The light leakage adjacent to the patterned spacer 40 may be referred to as a red-eye deterioration.

Specifically, the obliquely incident light may be transmitted to a portion of the color filter substrate 20 corresponding to an outer portion of the deteriorated portion of the first alignment layer. Accordingly, for the purpose of preventing the light leakage adjacent to the patterned spacer 40, the black matrix 24 may be formed to have a width greater than the shift range of the patterned spacer 40. For example, the black matrix 24 may be formed to have a width of two times to four times of a width (a diameter) of the patterned spacer 40. However, when the black matrix 24 is formed to sufficiently cover the periphery of the patterned spacer 40, the open portion of the pixel region P is reduced to cause reduction in aperture ratio.

Further, since the backlight unit having high brightness property is required to compensate the reduction in aperture ratio and obtain proper brightness of the LCD device 1, cost and power consumption of the LCD device 1 increase.

When the array substrate 10 has an uneven portion on the surface thereof, the gate line, the gate insulating layer 14, the data line 16, the TFT Tr, the passivation layer 17 and the pixel electrode 18 also have an uneven portion. The uneven portion may cause deterioration in the display area AA such as a stain and degradation of display quality. The deterioration due to the uneven portion of the array substrate 10 may be referred to as a waviness deterioration.

Specifically, when the patterned spacer 40 is formed to correspond to the uneven portion of the array substrate 10, shift of the end portion of the patterned spacer 40 increases and deterioration of the first alignment layer is deepened. In addition, since a gap distance between the array substrate 10 and the color filter substrate 20 in the uneven portion is different from a gap distance between the array substrate 10 and the color filter substrate 20 in the other portion, uniformity in a cell gap of the LCD device 1 is deteriorated and display quality is degraded.

SUMMARY OF THE INVENTION

Accordingly, the present invention is directed to a liquid crystal display device and method of fabricating the same that substantially obviates one or more problems due to limitations and disadvantages of the related art.

Advantages of the invention will be set forth in the descriptions which follows, and in part will be apparent from the description, or may be learned by practice of the invention. The advantages will be realized and attained by the structure particularly pointed out in the written description and claims here of, as well as the appended drawings.

A liquid crystal display device includes: first and second substrates facing and spaced apart from each other; a gate line and a data line on an inner surface of the first substrate, the gate line and the data line crossing each other to define a pixel region; a thin film transistor connected to the gate line and the data line; a color filter layer on the thin film transistor, the color filter layer including red, green and blue color filters each corresponding to the pixel region; a protrusion pattern at a boundary of the pixel region, the protrusion pattern including at least two of the red, green and blue color filters; a pixel electrode on the color filter layer in the pixel region; a first alignment layer on the pixel electrode; a first patterned spacer on an inner surface of the second substrate, the first patterned spacer contacting the first alignment layer over the protrusion pattern; and a liquid crystal layer between the first and second substrates.

A method of fabricating a liquid crystal display device includes: forming a gate line and a data line on a first substrate, the gate line and the data line crossing each other to define a pixel region; forming a thin film transistor connected to the gate line and the data line; forming a color filter layer on the thin film transistor and a protrusion pattern at a boundary of the pixel region, the color filter layer including red, green and blue color filters each corresponding to the pixel region, the protrusion pattern including at least two of the red, green and blue color filters; forming a pixel electrode on the color filter layer in the pixel region; forming a first alignment layer on the pixel electrode; forming a first patterned spacer on a second substrate, the first patterned spacer disposed to correspond to the protrusion pattern; attaching the first and second substrates such that the first patterned spacer contacts the first alignment layer over the protrusion pattern; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the preferred embodiments, examples of which are illustrated in the accompanying drawings.

Figure 1:
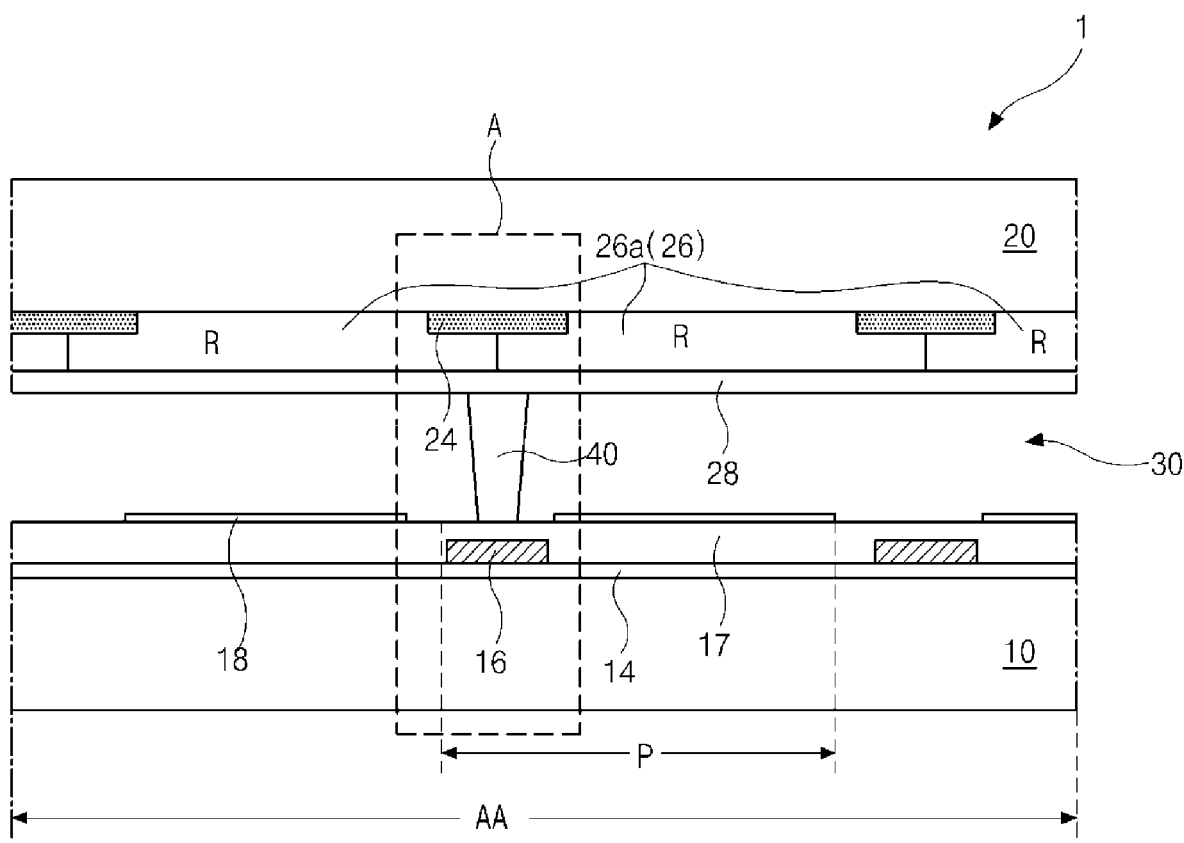
FIG. 1 is a cross-sectional view showing a liquid crystal display device according to the related art.
Figure 2:
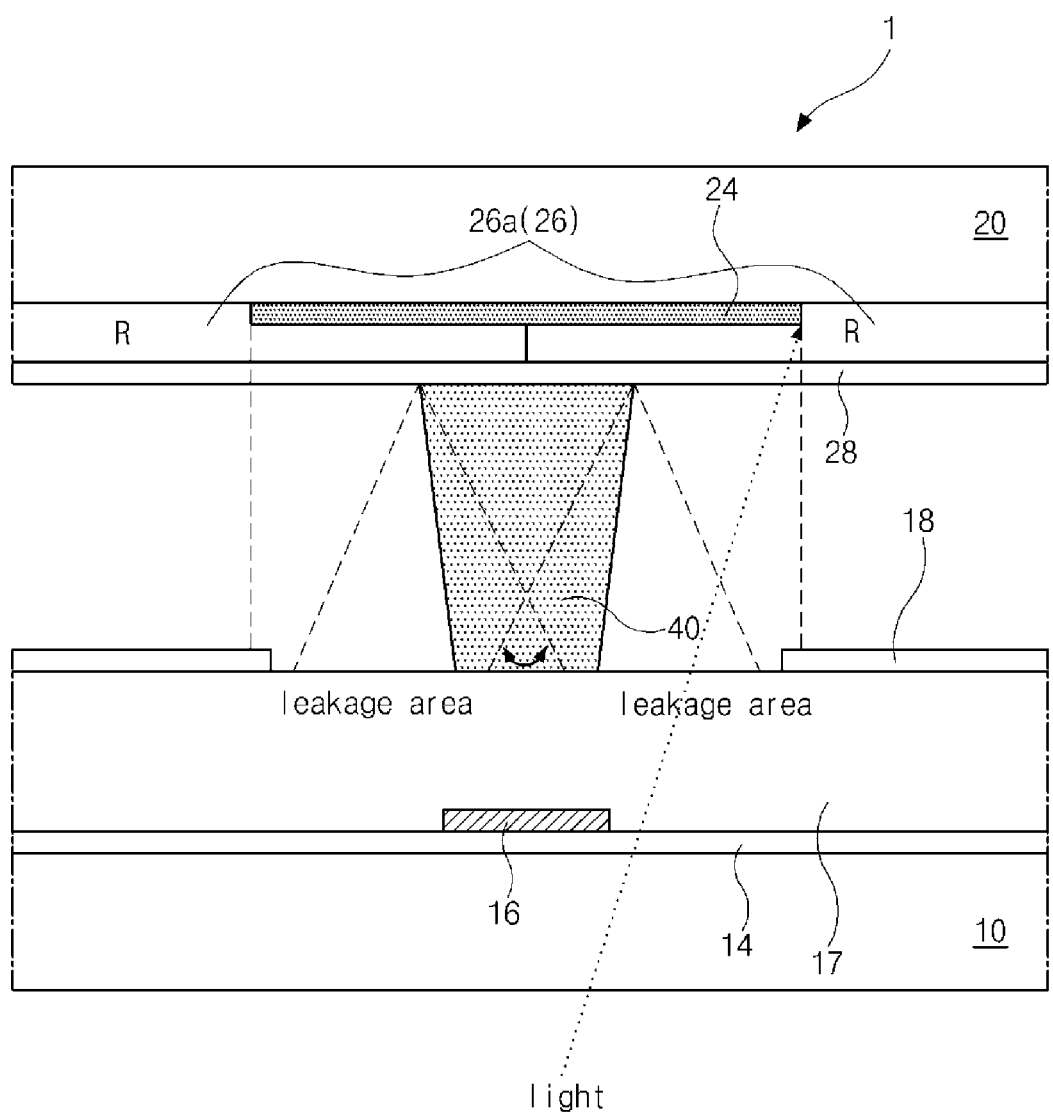
FIG. 2 is a magnified view showing a portion A of FIG. 1.
Figure 3:
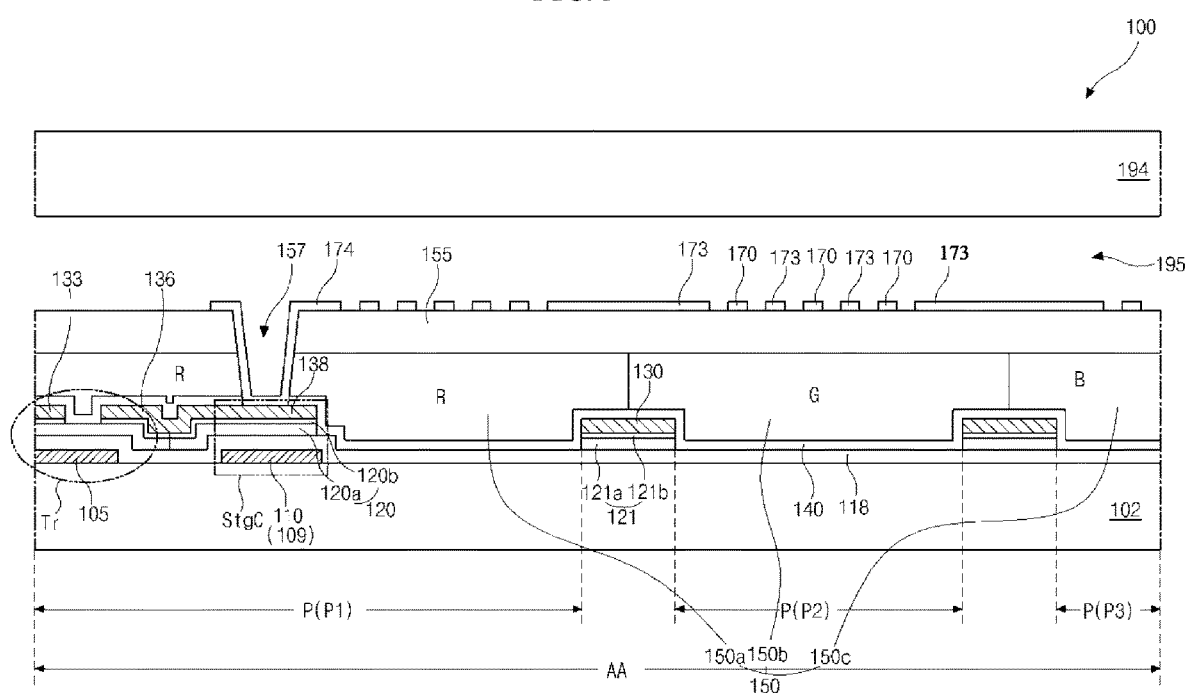
FIG. 3 is a cross-sectional view showing a liquid crystal display device according to a first embodiment of the present invention.
Figure 4A:
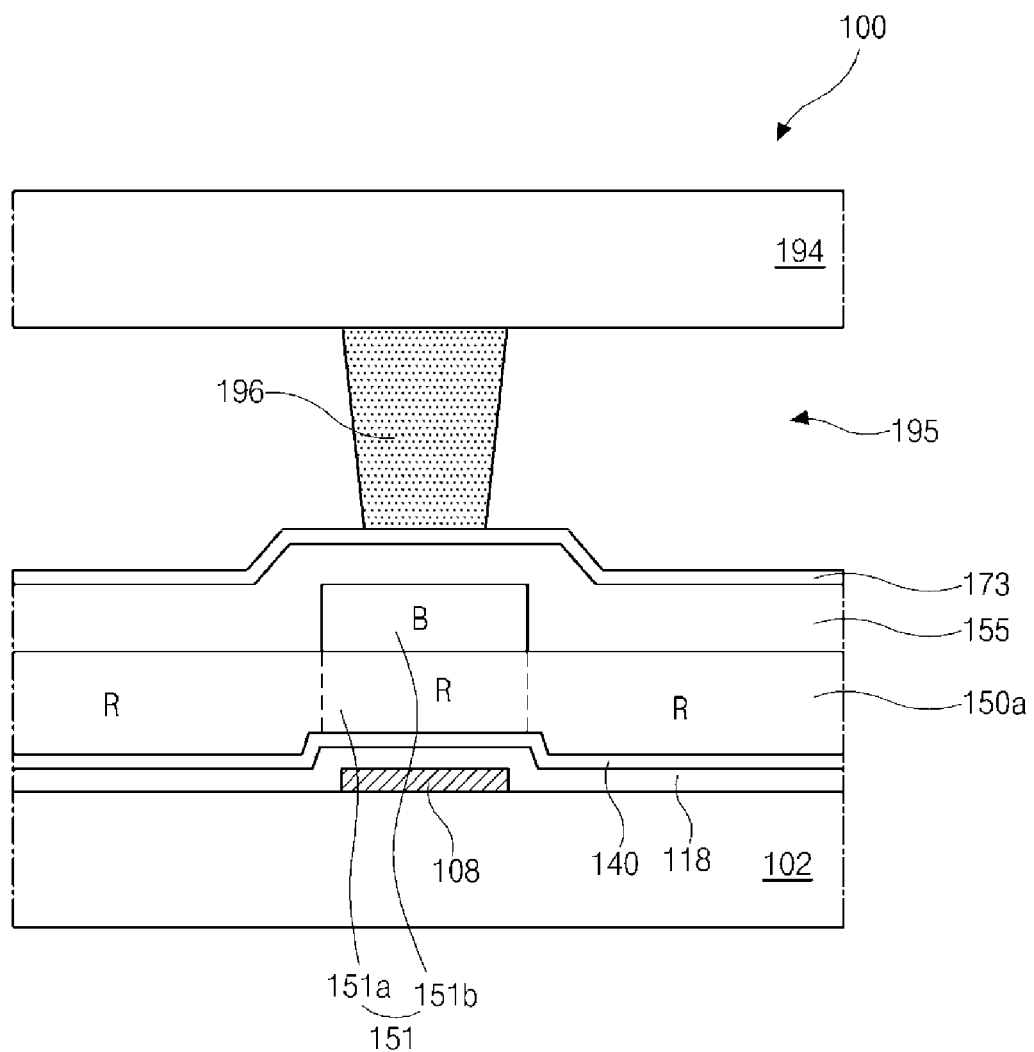
FIGS. 4A and 4B are cross-sectional views showing first and second patterned spacers, respectively, of a liquid crystal display device according to a first embodiment of the present invention.
Figure 4B:
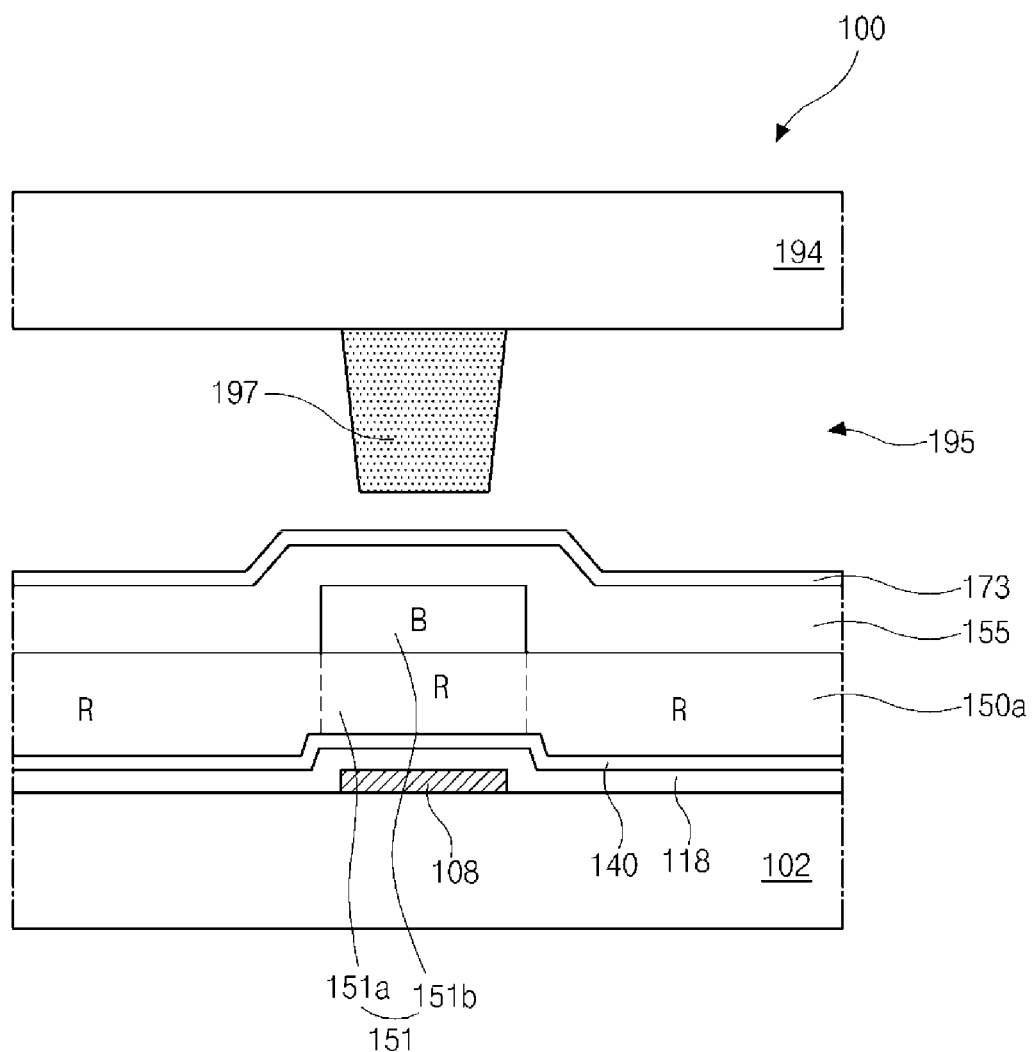

FIG. 3 is a cross-sectional view showing a liquid crystal display device according to a first embodiment of the present invention, and FIGS. 4A and 4B are cross-sectional views showing first and second patterned spacers, respectively, of a liquid crystal display device according to a first embodiment of the present invention.

In FIGS. 3, 4A and 4B, a liquid crystal display (LCD) device 100 according to a first embodiment of the present invention includes a first substrate 102 having a plurality of pixel electrodes 170, a plurality of common electrodes 173 and a color filter layer 150 and a protrusion pattern 151, a second substrate 194 having first and second patterned spacers 196 and 197, and a liquid crystal layer 195 between the first and second substrates 102 and 194. The first and second substrates 102 and 194 face into and are spaced apart from each other. In addition, the first and second substrates 102 and 194 include a display area AA and a non-display area (not shown) surrounding the display area AA. The display area AA includes a plurality of pixel regions P having first to third pixel regions P1, P2 and P3.

A gate line 108 and a common line 109 are formed on an inner surface of the first substrate 102. The gate line 108 and the common line 109 are spaced apart from and parallel to each other. A gate electrode 105 is connected to the gate line 108 and a portion of the common line 109 functions as a first capacitor electrode 110.

A gate insulating layer 118 of an inorganic insulating material such as silicon oxide ($SiO_2$) and silicon nitride (SiNx) is formed on the gate line 108, the gate electrode 105 and the common line 109.

A semiconductor layer 120 is formed on the gate insulating layer 118 over the gate electrode 105. The semiconductor layer 120 includes an active layer 120a and an ohmic contact layer 120b on the active layer 120a. The active layer 120a may include intrinsic amorphous silicon and the ohmic contact layer 120b may include impurity-doped amorphous silicon.

A data line 130 is formed over the gate insulating layer 118 and a dummy pattern 121 having first and second patterns 121a and 121b is formed between the data line 130 and the gate insulating layer 118. The data line 130 crosses the gate line 108 to define a pixel region P. The dummy pattern 121, due to fabrication process, may have the same layer and the same material as the semiconductor layer 120, and the dummy pattern 121 may be omitted in another embodiment.

In addition, a source electrode 133 and a drain electrode 136 are formed on the semiconductor layer 120. The source electrode 133 is connected to the data line 130 and the drain electrode 136 is spaced apart from the source electrode 133. The source and drain electrodes 133 and 136 contact the ohmic contact layer 120b. Further, a portion of the drain electrode 136 functioning as a second capacitor electrode 138 is formed over the first capacitor electrode 110.

The gate electrode 105, the gate insulating layer 118, the semiconductor layer 120, the source electrode 133 and the drain electrode 136 constitute a thin film transistor (TFT) Tr of a switching element. Although the TFT Tr is disposed in the first pixel region P1, the TFT Tr is disposed in each of the second and third pixel regions P2 and P3. In addition, the first capacitor electrode 110, the gate insulating layer 118 and the second capacitor electrode 138 constitute a storage capacitor StgC.

A passivation layer 140 of an inorganic insulating material such as silicon oxide (SiO2) and silicon nitride (SiNx) is formed on the data line 130, the source electrode 133 and the drain electrode 136.

A color filter layer 150 including red, green and blue color filters 150a, 150b and 150c is formed on the passivation layer 140. The red, green and blue color filters 150a, 150b are sequentially and repeatedly disposed to correspond to the plurality of pixel regions P, respectively, and a border between the adjacent red, green and blue color filters 150a, 150b color filters corresponds to the gate line 108 and the data line 130. For example, the red, green and blue color filters 150a, 150b correspond to the first, second and third pixel regions, respectively.

A protrusion pattern 151 having a circular shape is formed on the passivation layer 140 over the gate line 108 to correspond to first and second patterned spacers 196 and 197 on an inner surface of the second substrate 194. The protrusion pattern 151 is disposed at a border between adjacent pixel regions P. For example, the protrusion pattern 151 may be disposed over the gate line 108 or the data line 130. Further, each pixel region P may correspond to one protrusion pattern 151 or the plurality of pixel regions P may correspond to one protrusion pattern 151.

In addition, the protrusion pattern 151 may include at least two of the red, green and blue color filters 150a, 150b and 150c. For example, the protrusion pattern 151 may include first and second color dummy patterns 151a and 151b which are formed of two of the red, green and blue color filters 150a, 150b and 150c. Although the first and second dummy patterns 151a and 151b are formed of red and blue color filters 150a and 150c, respectively, in the first embodiment, the first and second color dummy patterns may be formed of red and green color filters 150a and 150b, respectively, or green and blue color filters 150b and 150c, respectively, in another embodiment. Alternatively, the protrusion pattern may include first, second and third color dummy patters formed of red, green and blue color filters 150a, 150b and 150c, respectively.

Since the second color dummy pattern 151b overlaps and is formed on the first color dummy pattern 151a, the protrusion pattern 151 protrudes from the first substrate 102. When an exterior pressure is applied to the LCD device 100, the first and second patterned spacers 196 and 197 may be shifted and a first alignment layer (not shown) on the plurality of common electrodes 173 may deteriorated due to shift of an end portion of the first and second patterned spacers 196 and 197. However, since a protrusion portion of the first alignment layer corresponding to the protrusion pattern 151 protrudes from the first substrate 102, the end portion of the first and second patterned spacers 196 and 197 contacts the protrusion portion of the first alignment layer and does not contact the other portion of the first alignment layer. As a result, deterioration is limited to the protrusion portion of the first alignment layer.

In addition, since the protrusion pattern 151 is formed of at least two of the red, green and blue color filters 150a, 150b and 150c, the protrusion pattern 151 blocks a visible light to function as a black matrix and a light from a backlight unit is blocked by the protrusion pattern 151 before the light passes through the deteriorated portion of the first alignment layer. As a result, the light leakage is prevented even when the protrusion portion of the first alignment layer is deteriorated.

Further, since both of the normally incident light and the obliquely incident light are blocked by the protrusion pattern 151, the protrusion pattern 151 may be formed to have a width (a diameter) equal to or smaller than the shift range of the first and second patterned spacer 196 and 197 and greater than a width (a diameter) of the first and second patterned spacers 196 and 197. Since the width of the protrusion pattern 151 is reduced as compared with the width of the black matrix of the related art, the aperture ratio is improved.

Although the protrusion pattern 151 is disposed at the border of the pixel region P such as the gate line 108 or the data line 130 in the first embodiment, the protrusion pattern may be disposed at various positions in another embodiment.

Figure 5:
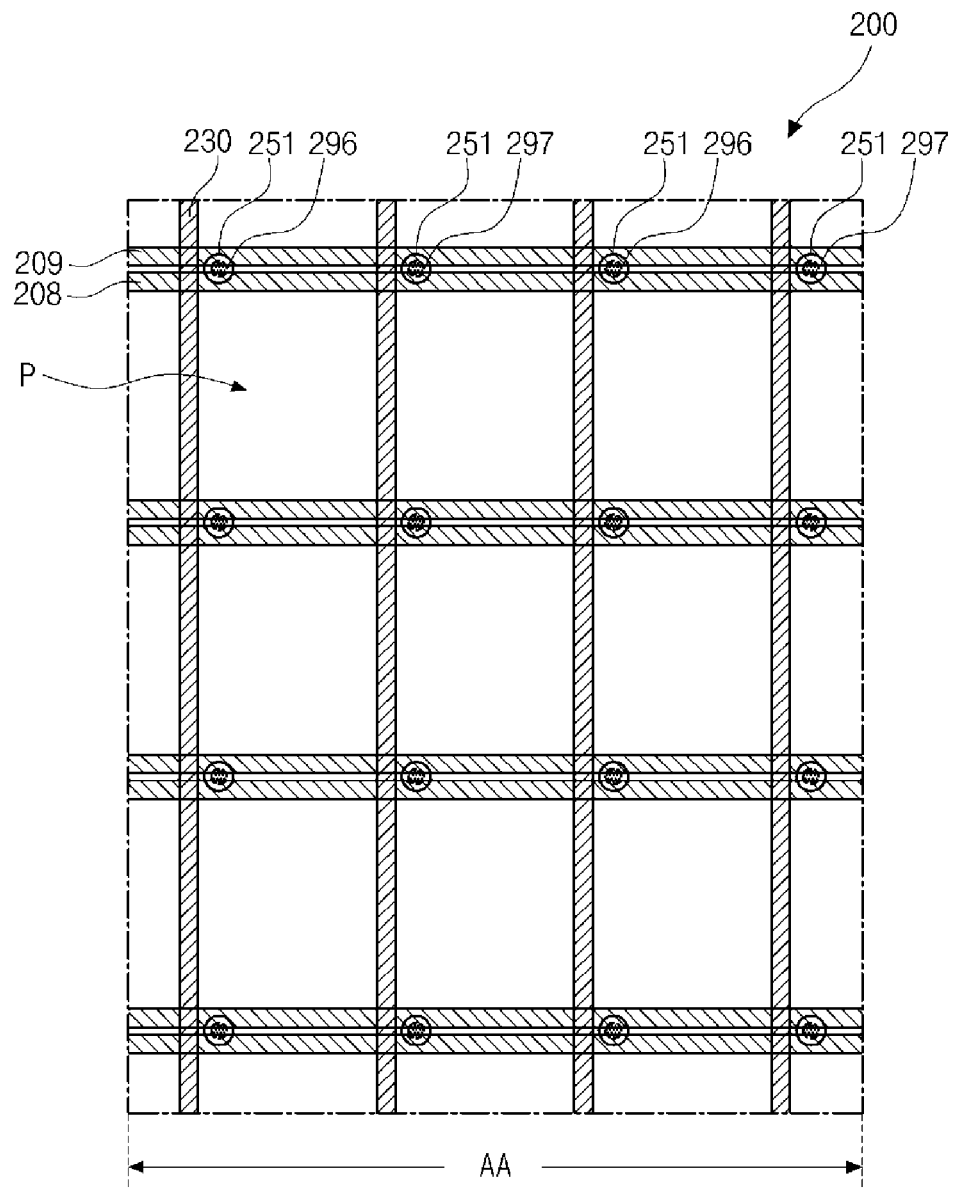
FIG. 5 is a plan view showing a liquid crystal display device according to a second embodiment of the present invention.

FIG. 5 is a plan view showing a liquid crystal display device according to a second embodiment of the present invention.

In FIG. 5, a liquid crystal display (LCD) device 200 according to a second embodiment of the present invention includes a first substrate (not shown) having a plurality of pixel electrodes (not shown), a plurality of common electrodes (not shown) and a color filter layer (not shown), a second substrate (not shown) having a protrusion pattern 251, and a liquid crystal layer (not shown) between the first and second substrates. The first and second substrates face into and are spaced apart from each other. In addition, the first and second substrates includes a display area AA and a non-display area (not shown) surrounding the display area AA. The display area AA includes a plurality of pixel regions P.

A gate line 208, a common line 209 and a data line 230 are formed on an inner surface of the first substrate. The gate line 208 and the common line 209 are spaced apart from and parallel to each other. The data line 230 crosses the gate line 208 to define a pixel region P.

The protrusion pattern 251 having a circular shape is formed over the gate line 208 and the common line 209 to correspond to first and second patterned spacers 296 and 297 on an inner surface of the second substrate. For example, the protrusion pattern 251 may be disposed over a gap space between the gate line 208 and the common line 209 to overlap the gate line 208 and the common line 209. Further, the protrusion pattern 251 may be formed to have a width (a diameter) equal to or smaller than the shift range of the first and second patterned spacer 296 and 297. In addition, the protrusion pattern 251 may include at least two of red, green and blue color filters (not shown). The other structure except the protrusion pattern 251 of the second embodiment is the same as the structure of the first embodiment.

Although the protrusion pattern 151 or 251 has a circular shape (an island shape which is separated from the other patterns) in the first and second embodiments, the protrusion pattern may have various shapes in another embodiment.

Figure 6A:
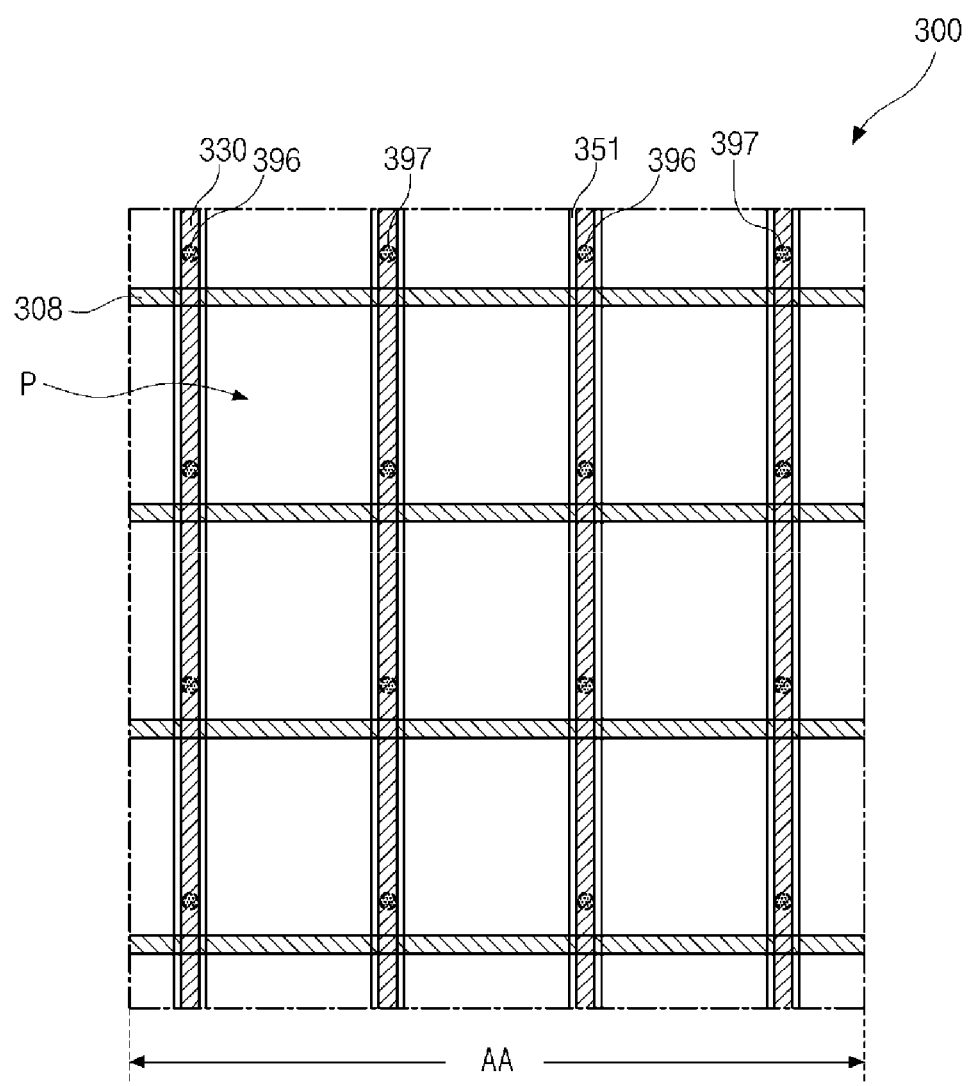
FIGS. 6A and 6B are plan views showing liquid crystal display devices according to third and fourth embodiments, respectively, of the present invention.
Figure 6B:
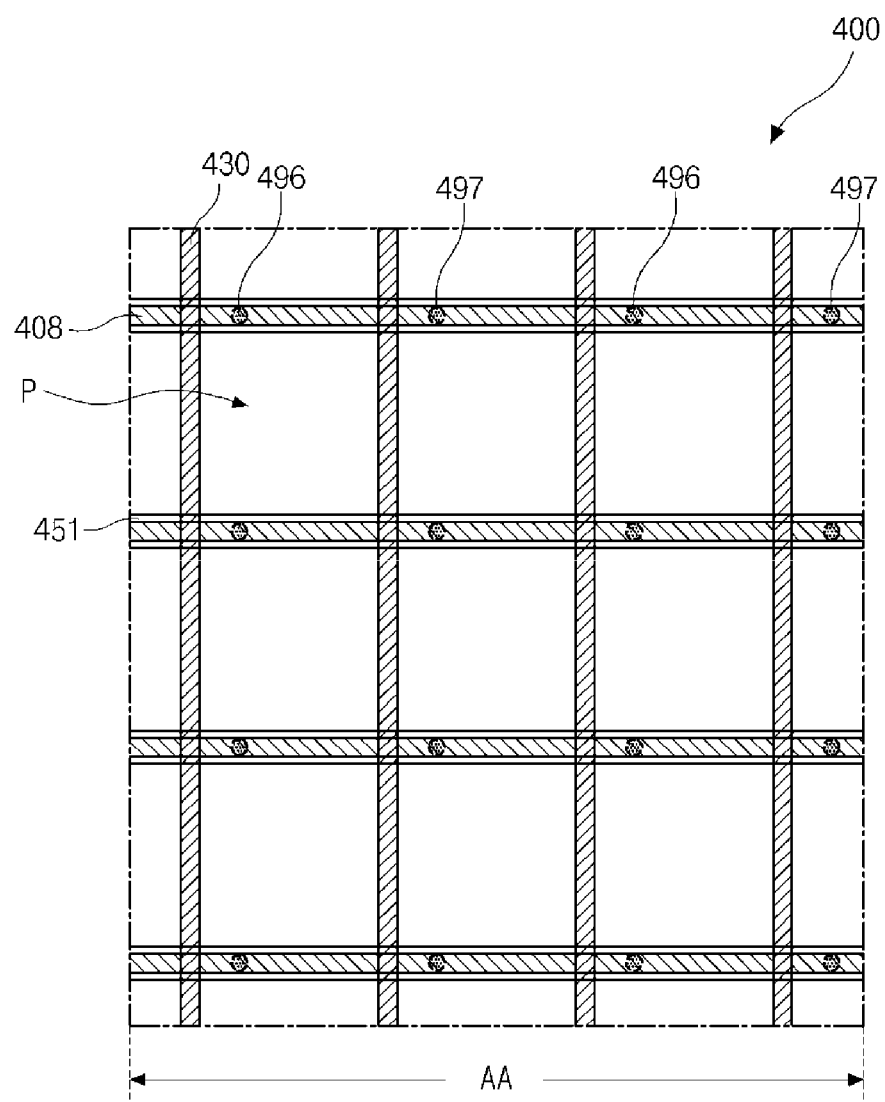

FIGS. 6A and 6B are plan views showing liquid crystal display devices according to third and fourth embodiments, respectively, of the present invention.

In FIGS. 6A and 6B, each of a liquid crystal display (LCD) device 300 according to a third embodiment of the present invention and an LCD device 400 according to a fourth embodiment of the present invention includes a first substrate (not shown) having a plurality of pixel electrodes (not shown), a plurality of common electrodes (not shown) and a color filter layer (not shown), a second substrate (not shown) having a protrusion pattern 351 or 451, and a liquid crystal layer (not shown) between the first and second substrates. The first and second substrates face into and are spaced apart from each other. In addition, the first and second substrates include a display area AA and a non-display area (not shown) surrounding the display area AA. the display area AA includes a plurality of pixel regions P.

In FIG. 6A, a gate line 308 and a data line 330 are formed on an inner surface of the first substrate. The data line 330 crosses the gate line 308 to define a pixel region P.

The protrusion pattern 351 having a bar shape is formed over the data line 330 to correspond to first and second patterned spacers 396 and 397 on an inner surface of the second substrate. For example, the protrusion pattern 351 may be disposed along the data line 330 throughout the whole first substrate to cover the data line 330 completely. Further, the protrusion pattern 351 may be formed to have a width equal to or smaller than the shift range of the first and second patterned spacers 396 and 397. For example, the width of the protrusion pattern 351 may be greater than a width of the data line 330. In addition, the protrusion pattern 351 may include at least two of red, green and blue color filters (not shown). The other structure except the protrusion pattern 351 of the third embodiment is the same as the structure of the first embodiment.

In FIG. 6B, a gate line 408 and a data line 430 are formed on an inner surface of the first substrate. The data line 430 crosses the gate line 408 to define a pixel region P.

The protrusion pattern 451 having a bar shape is formed over the gate line 408 to correspond to first and second patterned spacers 496 and 497 on an inner surface of the second substrate. For example, the protrusion pattern 451 may be disposed along the gate line 408 throughout the whole first substrate to cover the gate line 408 completely. Further, the protrusion pattern 451 may be formed to have a width equal to or smaller than the shift range of the first and second patterned spacers 496 and 497. For example, the width of the protrusion pattern 451 may be greater than a width of the gate line 408. In addition, the protrusion pattern 451 may include at least two of red, green and blue color filters (not shown). The other structure except the protrusion pattern 451 of the fourth embodiment is the same as the structure of the first embodiment.

In the third and fourth embodiments, since the protrusion pattern 351 or 451 having a bar shape is formed along the data line 330 or the gate line 408, the first substrate having the protrusion pattern 351 or 451 and the second substrate having the first and second patterned spacers 396 and 397 or 496 and 497 may be attached to each other without consideration of alignment error along a direction of the protrusion pattern 351 or 451. As a result, degree of freedom in design is improved.

In addition, since the protrusion pattern 351 or 451 blocking a light is formed along the data line 330 or the gate line 408 which is a border between the adjacent pixel regions P to function as a black matrix, an additional black matrix is omitted. As a result, the number of mask process is reduced and material cost is reduced so that fabrication cost can be reduced.

Figure 7:
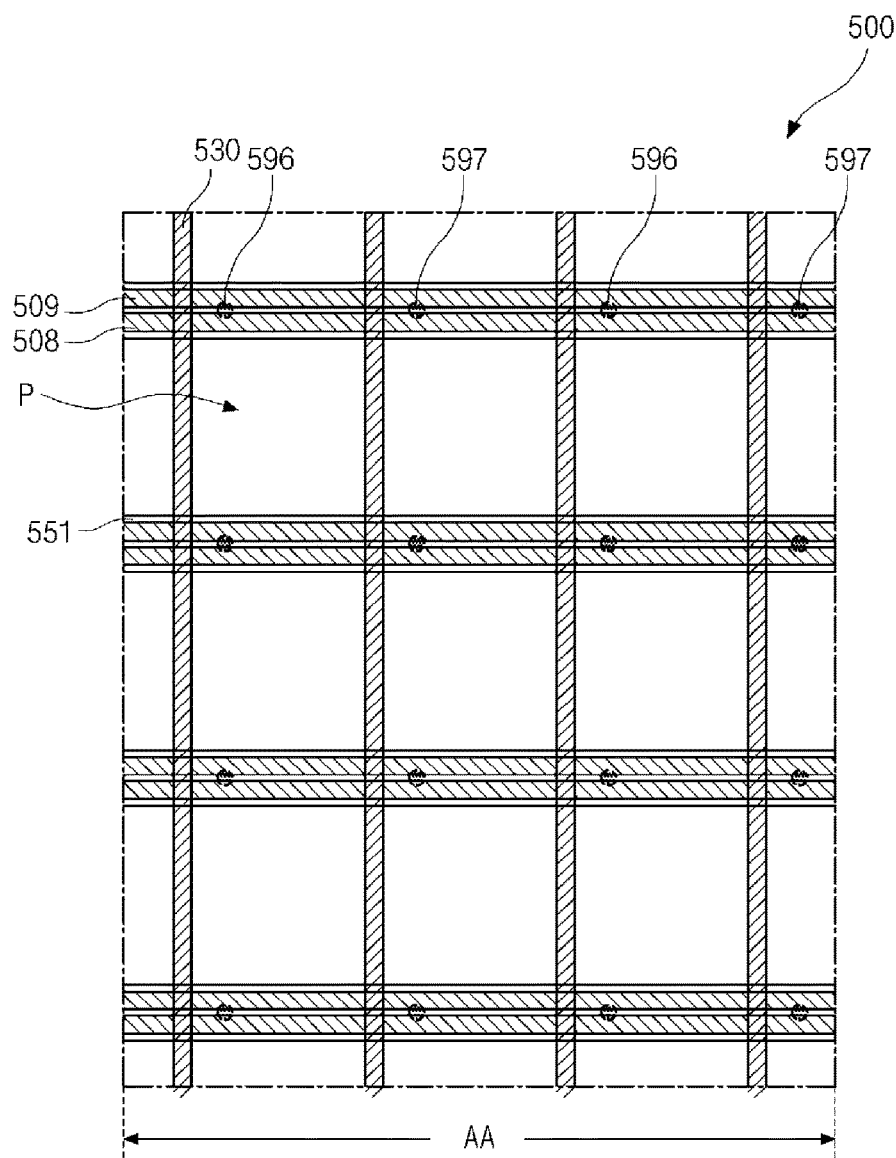
FIG. 7 is a plan view showing a liquid crystal display device according to a fifth embodiment of the present invention.

FIG. 7 is a plan view showing a liquid crystal display device according to a fifth embodiment of the present invention.

In FIG. 7, a liquid crystal display (LCD) device 500 according to a fifth embodiment of the present invention includes a first substrate (not shown) having a plurality of pixel electrodes (not shown), a plurality of common electrodes (not shown) and a color filter layer (not shown), a second substrate (not shown) having a protrusion pattern 551, and a liquid crystal layer (not shown) between the first and second substrates. The first and second substrates face into and are spaced apart from each other. In addition, the first and second substrates includes a display area AA and a non-display area (not shown) surrounding the display area AA. The display area AA includes a plurality of pixel regions P.

A gate line 508, a common line 509 and a data line 530 are formed on an inner surface of the first substrate. The gate line 508 and the common line 509 are spaced apart from and parallel to each other. For example, a gap space between the gate line 508 and the common line 509 may have a width of about 2 μm to about 4 μm. The data line 530 crosses the gate line 508 to define a pixel region P.

The protrusion pattern 551 having a bar shape is formed over the gate line 508 and the common line 509 to correspond to first and second patterned spacers 596 and 597 on an inner surface of the second substrate. For example, the protrusion pattern 551 may be disposed along the gap space between the gate line 508 and the common line 509 throughout the whole first substrate to cover the gate line 508 and the common line 509 completely. Further, the protrusion pattern 551 may be formed to have a width equal to or smaller than the shift range of the first and second patterned spacers 596 and 597. For example, the width of the protrusion pattern 551 may be greater than a sum of a width of the gate line 508, a width of the common line 509 and a width of the gap space between the gate line 508 and the common line 509. In addition, the protrusion pattern 551 may include at least two of red, green and blue color filters (not shown). The other structure except the protrusion pattern 551 of the third embodiment is the same as the structure of the first embodiment.

Referring again to FIGS. 3, 4A and 4B, a planarization layer 155 is formed on the color filter layer 150 and the protrusion pattern 151. The planarization layer 155 may include an organic insulating material such as photo acryl and may be formed by a coating method. In addition, the planarization layer 155 may be formed to have a flat top surface except a portion over the protrusion pattern 151. For example, the planarization layer 155 may planarize step differences due to the gate line 108, the common line 109, the data line 130, the source electrode 133 and the drain electrode 136 except step differences due to the protrusion pattern 151. Accordingly, a portion corresponding to the protrusion pattern 151 protrudes from the planarization layer 155 and the other portion has a flat top surface.

Specifically, the planarization layer 155 may planarize a step difference due to an uneven portion of the first substrate 102 and a step difference due to thickness difference between the red, green and blue color filters 150a, 150b and 150c. As a result, the waviness deterioration due to the uneven portion of the first substrate 102 is prevented and display quality is improved. When the color filter layer 150 sufficiently planarizes the step differences due to the uneven portion of the first substrate 102, the planarization layer 155 may be omitted in another embodiment.

Figure 8A:
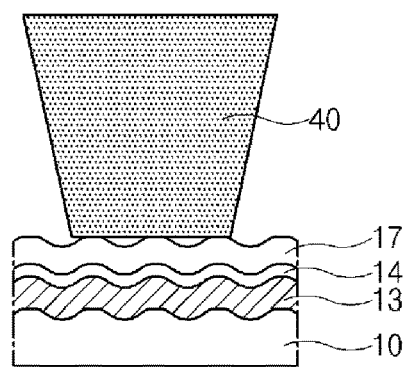
FIG. 8A is a cross-sectional view showing a liquid crystal display device according to the related art.
Figure 8B:
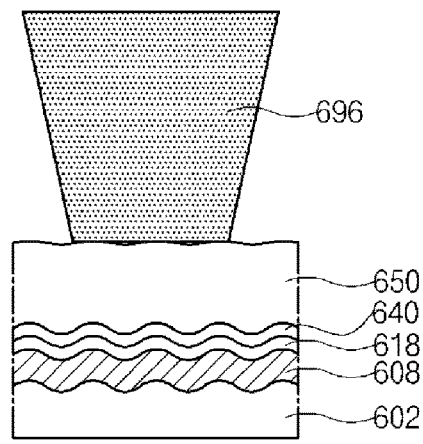
FIGS. 8B and 8C are cross-sectional views showing liquid crystal display devices according to sixth and first embodiments, respectively, of the present invention.
Figure 8C:
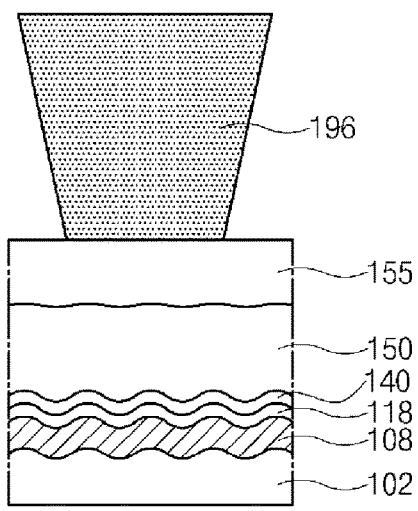

FIG. 8A is a cross-sectional view showing a liquid crystal display device according to the related art, and FIGS. 8B and 8C are cross-sectional views showing liquid crystal display devices according to sixth and first embodiments, respectively, of the present invention.

In FIG. 8A, a gate electrode 13, a gate insulating layer 14 and a passivation layer 17 are formed on an array substrate 10 having an uneven portion. Since the uneven portion of the array substrate 10 is reflected to the passivation layer 17, the passivation layer 17 also has an uneven portion. As a result, an end portion of a patterned spacer 40 on a color filter substrate (not shown) does not completely contact the passivation layer 17.

In FIG. 8B, a gate electrode 608, a gate insulating layer 618, a passivation layer 640 and a color filter layer 650 are formed on a first substrate 602 having an uneven portion. Although the passivation layer 640 also has an uneven portion reflecting the uneven portion of the first substrate 602, the uneven portion of the passivation layer 640 is alleviated by the color filter layer 650. As a result, unevenness of a top surface of the color filter layer 650 is reduced and contact state between an end portion of a first patterned spacer 696 on a second substrate (not shown) and the color filter layer 650 is improved.

In FIG. 8C, a gate electrode 108, a gate insulating layer 118, a passivation layer 140, a color filter layer 150 and a planarization layer 155 are formed on a first substrate 102 having an uneven portion. Although the passivation layer 140 also has an uneven portion reflecting the uneven portion of the first substrate 102, the uneven portion of the passivation layer 140 is alleviated by the color filter layer 150 and the planarization layer 155. As a result, the planarization layer 155 has a flat top surface without unevenness and an end portion of a first patterned spacer 196 on a second substrate (not shown) completely contacts the planarization layer 155. Accordingly, the waviness deterioration due to the uneven portion of the first substrate 102 is prevented and display quality is improved.

Referring again to FIGS. 3, 4A and 4B, the planarization layer 155, the color filter layer 150, the passivation layer 140 and the gate insulating layer 118 have a common contact hole (not shown) exposing the common line 109. In addition, the planarization layer 155, the color filter layer 150 and the passivation layer 140 have a drain contact hole 157 exposing the drain electrode 136.

A plurality of pixel electrodes 170 and a plurality of common electrodes 173 are formed on the planarization layer 155 in the display area AA. The plurality of pixel electrodes 170 each having a bar shape are alternately disposed with the plurality of common electrodes 173 each having a bar shape. In addition, the plurality of pixel electrodes 170 and the plurality of common electrodes 173 may have a single layer of a transparent conductive material such as indium-tin-oxide (ITO) and indium-zinc-oxide (IZO) or a metallic material such as molybdenum (Mo), molybdenum titanium (MoTi) and copper (Cu). Alternatively, the plurality of pixel electrodes 170 and the plurality of common electrodes 173 may have multiple layers of at least two of the transparent conductive material and the metallic material.

The plurality of common electrodes 173 may be formed to completely cover the data line 130 which is a border between the adjacent pixel regions P to prevent light leakage through a portion adjacent the data line 130 even when a black matrix is omitted.

Each of the plurality of pixel electrodes 170 and the plurality of common electrodes 173 may have a straight bar shape or a bent bar shape. The bent bar shape may have a bent portion at a center of the pixel region P to have a symmetrical structure with respect to the bent portion. When each of the plurality of pixel electrodes 170 and the plurality of common electrodes 173 has the bent bar shape, the pixel region P includes two domains and color difference according to a viewing angle is minimized.

The plurality of pixel electrodes 170 are connected to a pixel auxiliary pattern 174 in the pixel region P and the pixel auxiliary pattern 174 is connected to the drain electrode 136 through the drain contact hole 157. In addition, the plurality of common electrodes 173 are connected to a common auxiliary pattern (not shown) in the pixel region P and the common auxiliary pattern is connected to the common line 109 through the common contact hole.

Although not shown, a first alignment layer is formed in the entire display area AA of the first substrate 102 having the plurality of pixel electrodes 170 and the plurality of common electrodes 173.

A plurality of first patterned spacer 196 and a plurality of second patterned spacers 197 are formed on an inner surface of the second substrate 194. Each of the plurality of first patterned spacers 196 may have a first height and may be disposed to correspond to a boundary of the pixel region P. In addition, each of the plurality of second patterned spacers 197 may have a second height smaller than the first height and may be disposed to correspond to the boundary of the pixel region P.

The plurality of first patterned spacers 196 may be disposed to correspond to the protrusion pattern 151. The plurality of first patterned spacers 196 may contact the first alignment layer over the protrusion pattern 151 to maintain a uniform cell gap which is a gap distance between the first and second substrates 102 and 194.

The plurality of second patterned spacers 197 may be disposed to correspond to the protrusion pattern 151. The plurality of second patterned spacers 197 may be spaced apart from the first alignment layer over the protrusion pattern 151. When a pressure is applied to the LCD device 100 from exterior, the plurality of second patterned spacers 197 may contact the first alignment layer over the protrusion pattern 151. Since the pressure applied to the plurality of first patterned spacers 196 is alleviated by the plurality of second patterned spacers 197, deterioration such as crushing of the plurality of first patterned spacers 196 due to the pressure is prevented.

Although not shown, a second alignment layer is formed in the entire display area of the second substrate 194 having the plurality of first patterned spacers 196 and the plurality of second patterned spacers 197.

A liquid crystal layer 195 is interposed between the first and second alignment layers. A seal pattern (not shown) for preventing leakage of the liquid crystal layer 195 is formed in the non-display area surrounding a display area AA.

The LCD device according to the first to sixth embodiments of the present invention has an in-plane switching (IPS) mode where the plurality of pixel electrodes and the plurality of common electrodes are formed on the first substrate and the liquid crystal layer is driven by a horizontal electric field. In addition, the LCD device according to the first to sixth embodiments of the present invention has a color filter on TFT (COT) type where the color filter layer is formed on the TFT over the first substrate without a black matrix. However, the LCD device according to another embodiment of the present invention may have a twisted nematic (TN) mode COT type where the pixel electrode and the common electrode are formed on the first substrate and the second substrate, respectively.

In the LCD device according to the first to sixth embodiments of the present invention, when the pressure is applied to the LCD device from exterior, deterioration of the first alignment layer due to shift of the first patterned spacer is limited by the protrusion pattern and the light leakage adjacent to the first patterned spacer is prevented. In addition, since the range of deterioration of the first alignment layer is minimized by the protrusion pattern, the aperture ratio is improved. Further, since a black matrix is omitted, the fabrication process is simplified and the fabrication cost is reduced. Moreover, since a black matrix on the second substrate is omitted and the color filter layer is formed on the first substrate, the first and second substrates are attached to each other without consideration of alignment error. As a result, degree of freedom in design is improved and the aperture ratio is improved.

FIGS. 9A to 9H are cross-sectional views showing a method of fabricating a liquid crystal display device according to a first embodiment of the present invention, and FIGS. 10A to 10H are cross-sectional views showing a method of fabricating a protrusion pattern of a liquid crystal display device according to a first embodiment of the present invention. The fabricating method of FIGS. 9A to 9H and FIGS. 10A to 10H may be applied to second to sixth embodiments of the present invention.

Figure 9A:
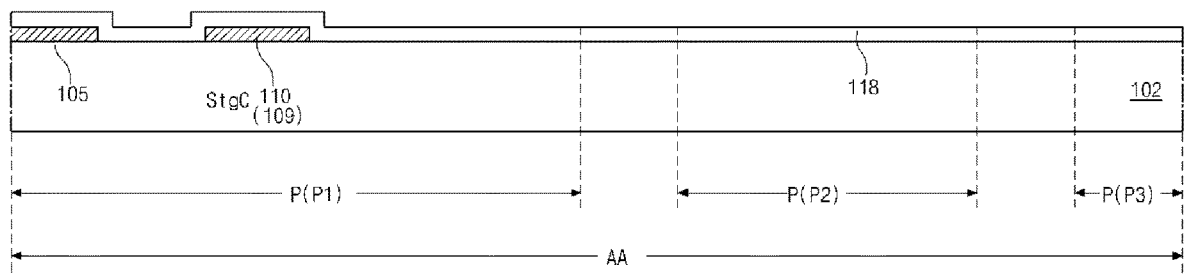
FIGS. 9A to 9H are cross-sectional views showing a method of fabricating a liquid crystal display device according to a first embodiment of the present invention.
Figure 10A:
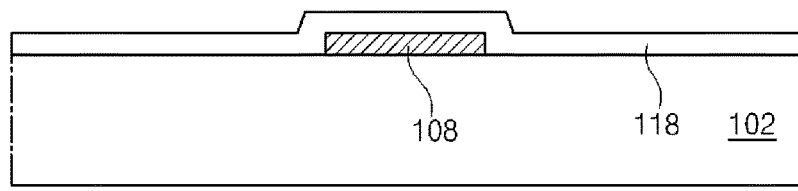
FIGS. 10A to 10H are cross-sectional views showing a method of fabricating a protrusion pattern of a liquid crystal display device according to a first embodiment of the present invention.

In FIGS. 9A and 10A, a first metal layer (not shown) is formed on a first substrate 102 of glass or plastic by depositing a first metallic material including at least one of aluminum (Al), aluminum alloy such as aluminum neodymium (AlNd), copper (Cu), copper alloy, molybdenum (Mo), molybdenum alloy such as molybdenum titanium (MoTi). The first substrate 102 includes a display area AA and a non-display area (not shown) surrounding the display area AA. The display area AA includes a plurality of pixel regions P having first to third pixel regions P1, P2 and P3.

The first metal layer is patterned through a first mask process to form a gate electrode 105, a gate line 108 and a common line 109. The first mask process may be a photolithographic process including a coating step of photoresist, an exposing step using a photo mask, a developing step of the exposed photoresist, an etching step of the first metal layer and a stripping step of the photoresist.

The gate electrode 105, the gate line 108 and the common line 109 may have a single layer of one of the first metallic material or multiple layers of at least two of the first metallic material. The gate electrode 105 is connected to the gate line 108 and the first capacitor electrode 110 is connected to the common line 109. The gate line 108 and the common line 109 are spaced apart from and parallel to each other. A portion of the common line 109 functions as a first capacitor electrode 110.

A gate insulating layer 118 is formed on the gate electrode 105, the gate line 108 and the common line 109 by depositing an inorganic insulating material such as silicon oxide ($SiO_2$) and silicon nitride (SiNx). The gate insulating layer 118 may cover an entire surface of the first substrate 102.

Figure 9B:
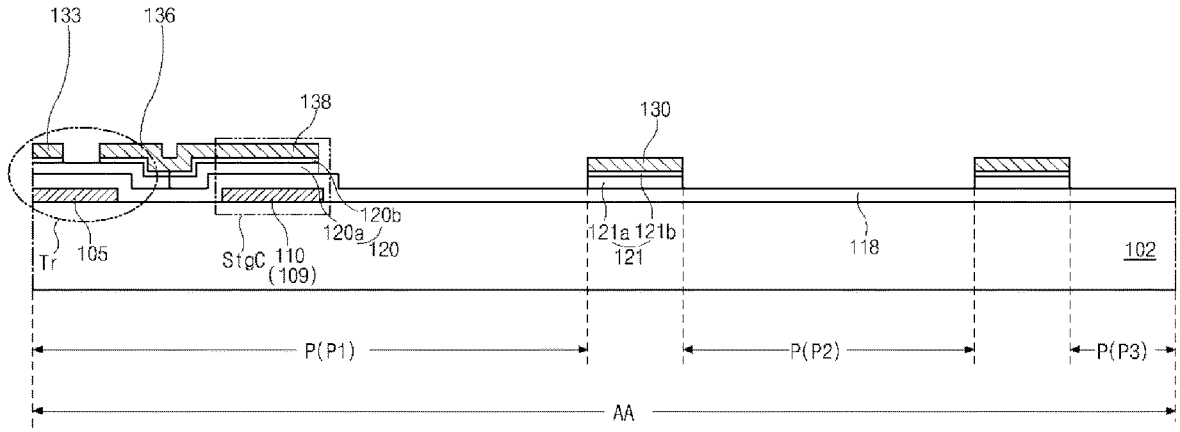
Figure 10B:
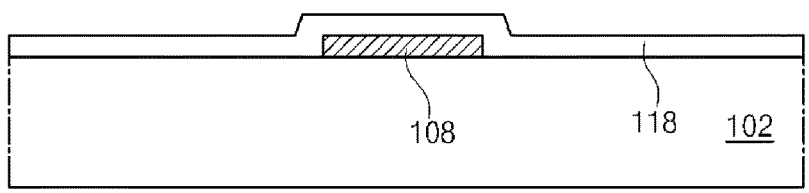

In FIGS. 9B and 10B, an intrinsic amorphous silicon layer (not shown) and an impurity-doped amorphous silicon layer (not shown) are sequentially formed on the gate insulating layer 118 by depositing intrinsic amorphous silicon and impurity-doped amorphous silicon. In addition, a second metal layer is formed on the impurity-doped amorphous silicon layer by depositing a second metallic material first metallic material including at least one of aluminum (Al), aluminum alloy such as aluminum neodymium (AlNd), copper (Cu), copper alloy, molybdenum (Mo), molybdenum alloy such as molybdenum titanium (MoTi). The second metal layer may have a single layer of one of the second metallic material or multiple layers of at least two of the second metallic material.

The second metal layer, the impurity-doped amorphous silicon layer and the intrinsic amorphous silicon layer are sequentially patterned through a second mask process using a single photo mask having a half-transmissive area or through second and third mask processes using respective photo masks to form a semiconductor layer 120 having an active layer 120a and an ohmic contact layer 120b, source and drain electrodes 133 and 136 on the semiconductor layer 120 and a data line 130 over the gate insulating layer 118. The active layer 120a of intrinsic amorphous silicon may be disposed over the gate electrode 105 and the ohmic contact layer 120b of impurity-doped amorphous silicon may be disposed on both end portions of the active layer 120a. The source electrode 133 may be connected to the data line 130 and the drain electrode 136 is spaced apart from the source electrode 133. The data line 130 may cross the gate line 108 to define the pixel region P.

A portion of the drain electrode 136 functioning as a second capacitor electrode 138 may overlap the first capacitor electrode 110 such that the first capacitor electrode 110, the gate insulating layer 118 and the second capacitor electrode 138 constitute a storage capacitor StgC. In addition, the gate electrode 105, the gate insulating layer 118, the semiconductor layer 120, the source electrode 133 and the drain electrode 136 constitute a thin film transistor (TFT) Tr of a switching element.

FIG. 9B exemplarily shows the data line 130, the source electrode 133 and the drain electrode 136 formed through a second mask process using a single photo mask having a half-transmissive area. The half-transmissive area may include a slit pattern or a halftone pattern. Since the data line 130, the source electrode 133 and the drain electrode 136 are formed by patterning the second metal layer, the impurity-doped amorphous silicon layer and the intrinsic amorphous silicon layer using the single photo mask, a dummy pattern 121 having first and second patterns 121a and 121b is formed between the data line 130 and the gate insulating layer 118. The first and second pattern 121a and 121b may have the same layer and the same material as the active layer 120a and the ohmic contact layer 120b, respectively. When the data line 130, the source electrode 133 and the drain electrode 136 are formed through second and third mask processes using respective photo masks, the dummy pattern 121 may be omitted.

Figure 9C:
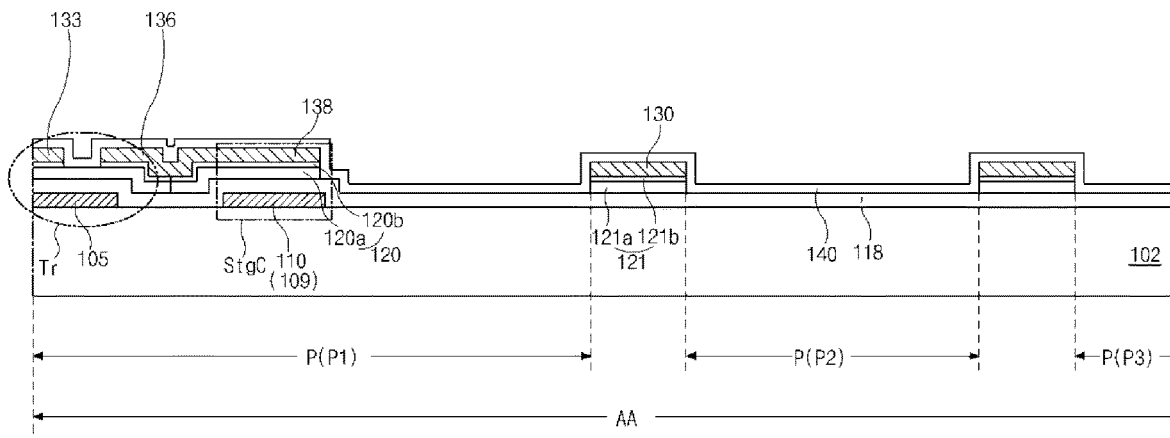
Figure 10C:
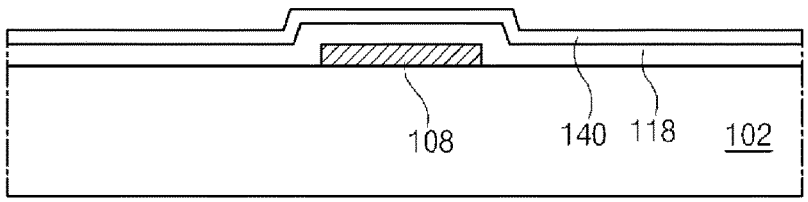

In FIGS. 9C and 10C, a passivation layer 140 is formed on the data line 130, the TFT Tr and the storage capacitor StgC by depositing an inorganic insulating material such as silicon oxide ($SiO_2$) and silicon nitride (SiNx). The passivation layer 140 may cover the entire surface of the first substrate 102.

A channel region of the TFT Tr which is the active layer 120a exposed between the source and drain electrodes 133 and 136 may be contaminated by a color filter layer 150 (of FIGS. 9H and 10H) contacting the active layer 120a and the TFT Tr may be deteriorated. For the purpose of preventing contamination of the active layer 120a, the passivation layer 140 is formed on the TFT Tr. The passivation layer 140 may be omitted in another embodiment.

Figure 9D:
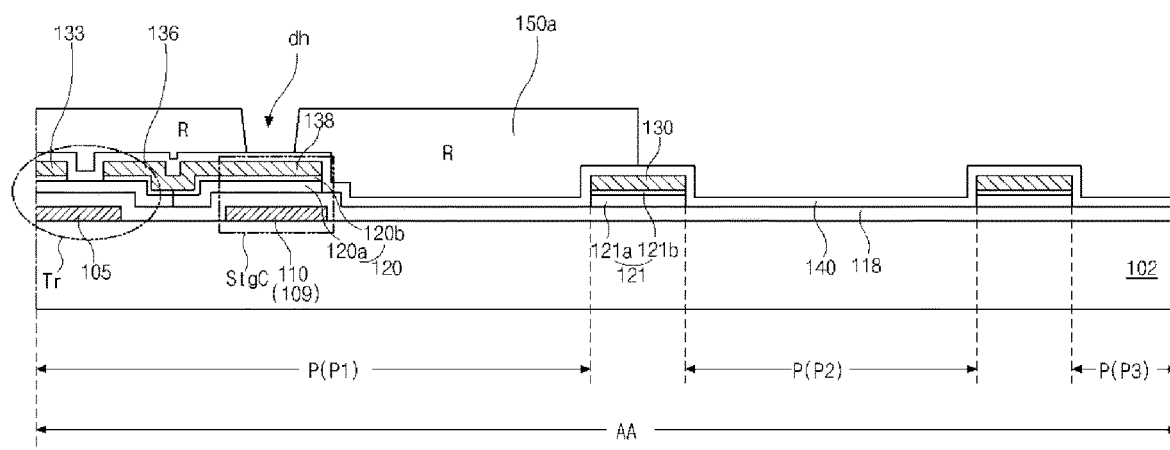
Figure 10D:
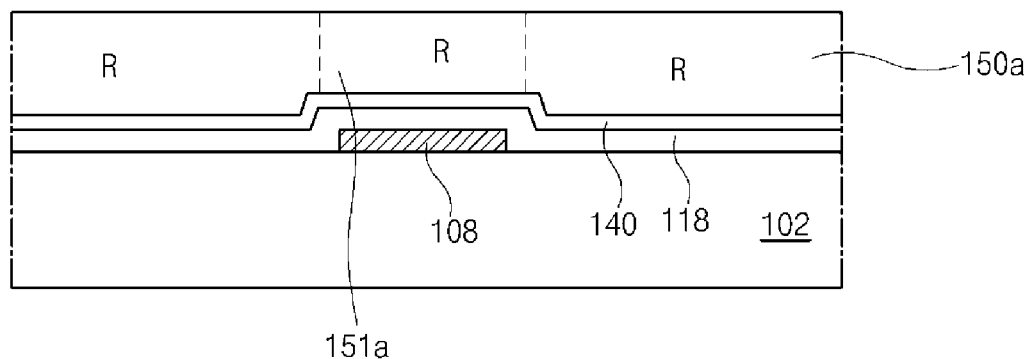

In FIGS. 9D and 10D, after a red photoresist (PR) layer (not shown) including a red pigment is formed on the passivation layer 140 through a coating method, a red color filter 150a is formed in a first pixel region P1 and a red (first) color dummy pattern 151a is formed at a border between adjacent pixel regions P through an exposing step and a developing step of the red PR layer. For example, the red color dummy pattern 151a may be disposed over the gate line 108, the data line 130 or a gap space between the gate line 108 and the common line 109. In addition, the red color dummy pattern 151a may have a circular shape or a bar shape. FIG. 10D exemplarily shows the red color dummy pattern 151a having a circular shape and over the gate electrode 108. In another embodiment where a protrusion pattern 151 (of FIG. 10F) includes green and blue color dummy patterns, the red color dummy pattern 151a may be omitted.

Figure 9E:
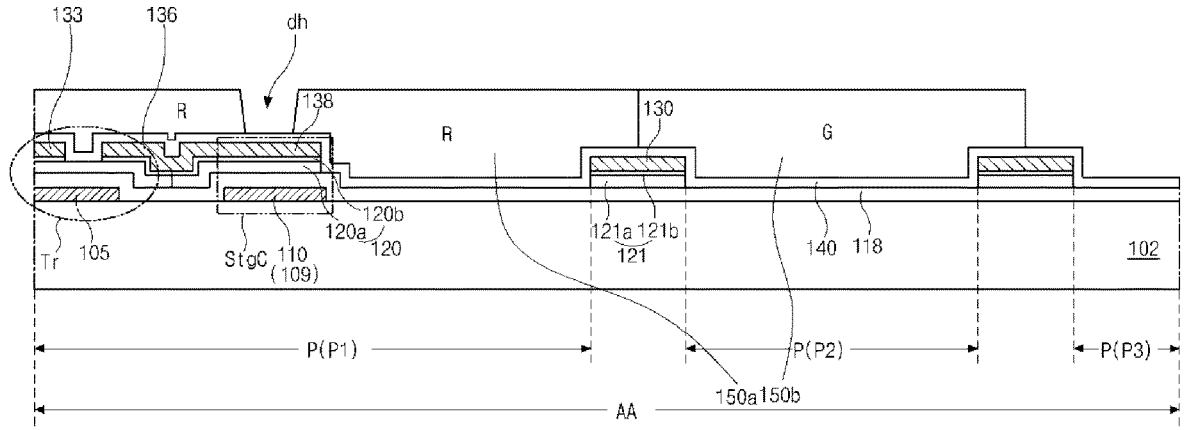
Figure 10E:
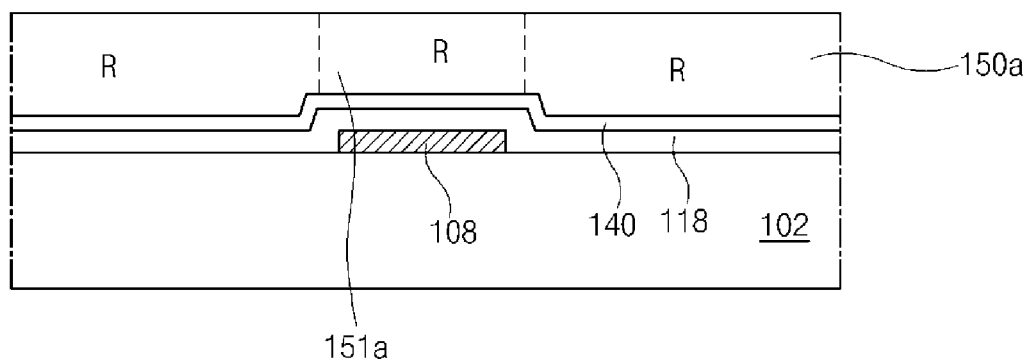

In FIGS. 9E and 10E, after a green PR layer (not shown) including a green pigment is formed on the red color filter 150a and the red color dummy pattern 151a through a coating method, a green color filter 150b is formed in a second pixel region P2 through an exposing step and a developing step of the green PR layer. Although a green color dummy pattern is omitted in FIG. 10E, a green color dummy pattern may be formed at a border between adjacent pixel regions P in another embodiment where the protrusion pattern includes red and green color dummy patterns, green and blue color dummy patterns, or red, green and blue color dummy patterns. The green color dummy pattern may have a circular shape or a bar shape.

Figure 9F:
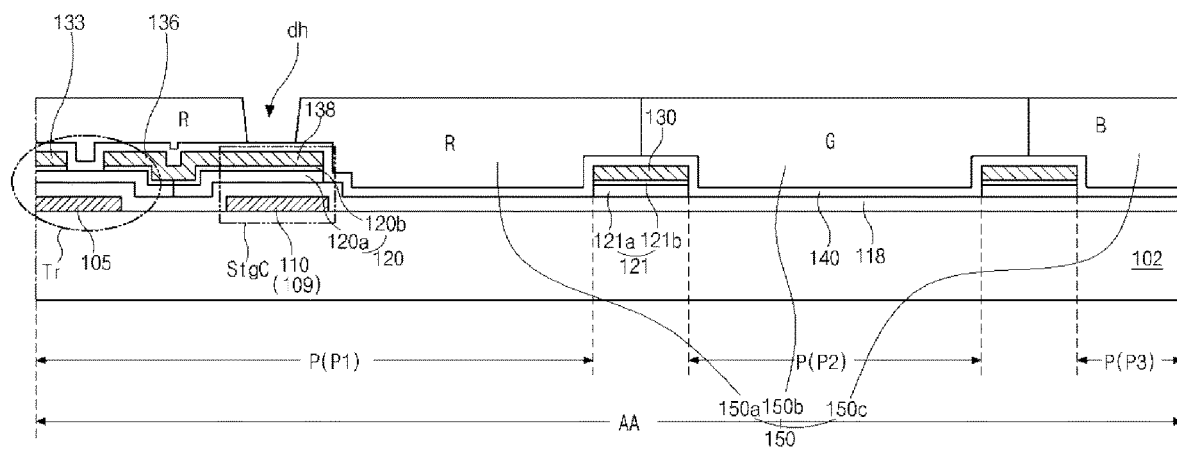
Figure 10F:
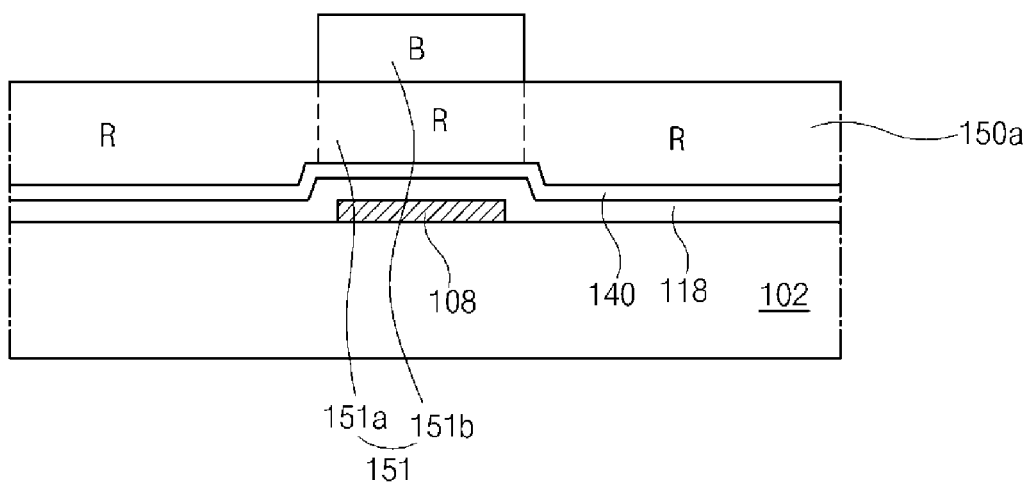

In FIGS. 9F and 10F, after a blue photoresist (PR) layer (not shown) including a blue pigment is formed on the red and green color filers 150a and 150b through a coating method, a blue color filter 150c is formed in a third pixel region P3 and a blue (second) color dummy pattern 151b is formed at a border between adjacent pixel regions P through an exposing step and a developing step of the blue PR layer. For example, the blue color dummy pattern 151b may be disposed over the gate line 108, the data line 130 or the gap space between the gate line 108 and the common line 109. In addition, the blue color dummy pattern 151c may have a circular shape or a bar shape. FIG. 10F exemplarily shows the blue color dummy pattern 151c having a circular shape and over the gate electrode 108. In another embodiment where the protrusion pattern 151 includes red and green color dummy patterns, the blue color dummy pattern 151c may be omitted.

The red, green and blue color filters 150a, 150b and 150c constitute a color filter layer 150, and the red and blue color dummy patterns 151a and 151b constitute a protrusion pattern 151. Although the red, green and blue color filters 150a, 150b and 150c are sequentially formed in the first embodiment, the formation order of the red, green and blue color filters 150a, 150b and 150c may vary in another embodiment. In addition, although the protrusion pattern 151 includes the red and blue color dummy patterns 151a and 151b in the first embodiment, the protrusion pattern 151 may include the red and green color dummy patterns, the green and blue color dummy patterns, or the red, green and blue color dummy patterns in another embodiment.

The red, green and blue color filters 150a, 150b and 150c have a drain hole dh exposing the passivation layer 140 over the drain electrode 136 and a common hole (not shown) exposing the passivation layer 140 over the common line 109. In another embodiment where the passivation layer 140 is omitted, the drain hole dh may expose the drain electrode 136 and the common hole may expose the gate insulating layer 118 over the common line 109.

Figure 9G:
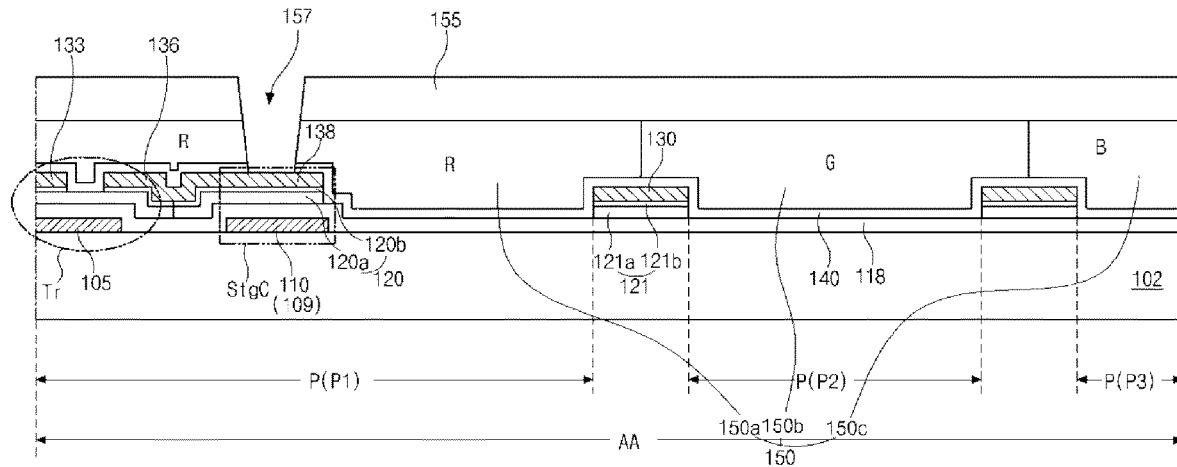
Figure 10G:
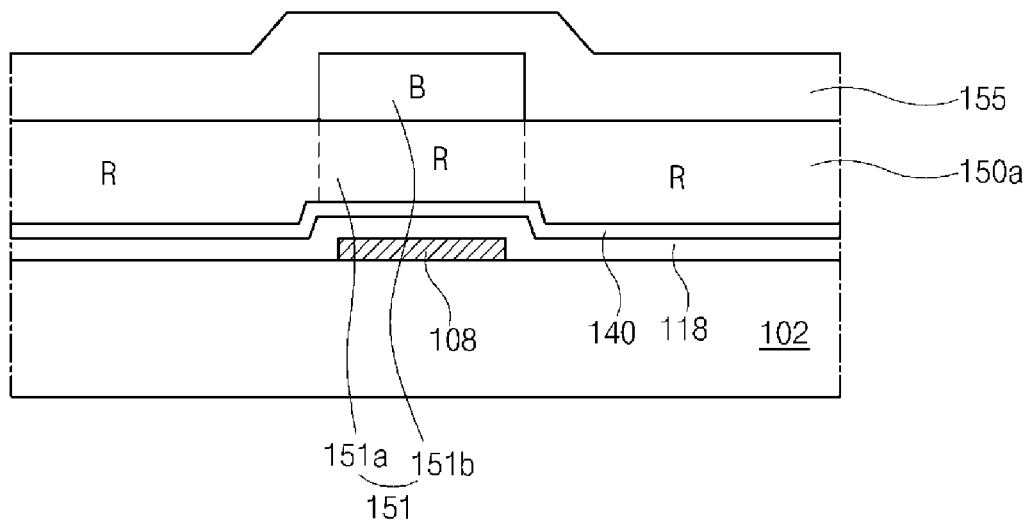

In FIGS. 9G and 10G, a planarization layer 155 is formed on the color filter layer 150 and the protrusion pattern 151 by coating an organic insulating material such as photo acryl. The planarization layer 155 may cover the entire surface of the first substrate 102. In addition, the planarization layer 155 may be formed to have a flat top surface except a portion over the protrusion pattern 151. For example, the planarization layer 155 may planarize step differences due to the gate line 108, the common line 109, the data line 130, the source electrode 133 and the drain electrode 136 except step differences due to the protrusion pattern 151. Specifically, since the planarization layer 155 planarizes a step difference due to an uneven portion of the first substrate 102, the waviness deterioration due to the uneven portion of the first substrate 102 is prevented and display quality is improved.

Since the planarization layer 155 has a thickness similar to the color filter layer 150, the portion corresponding to the protrusion pattern 151 protrudes from the planarization layer 155. For example, each of the color filter layer 150 and the planarization layer 155 may have a thickness of about 1 µm to about 1.5 µm.

Next, the planarization layer 155 is patterned to have a first opening corresponding to the drain hole dh and a second opening corresponding to common hole (not shown) through a third mask process including an exposing step and a developing step of the planarization layer 155. As a result, the first opening exposes the passivation layer 140 over the drain electrode 136 and the second opening exposes the gate insulating layer 118 over the common line 109. In another embodiment where the passivation layer 140 is omitted, the first opening may expose the drain electrode 136.

Next, the passivation layer 140 is removed through the first opening and the drain hole dh by a dry etching method, and the passivation layer 140 and the gate insulating layer 118 are removed through the second opening and the common hole are removed by a dry etching method, thereby forming a drain contact hole 157 exposing the drain electrode 136 and a common contact hole (not shown) exposing the common line 109. In another embodiment where the passivation layer 140 is omitted, the gate insulating layer 118 is removed through the second opening and the common hole by a dry etching method.

Figure 9H:
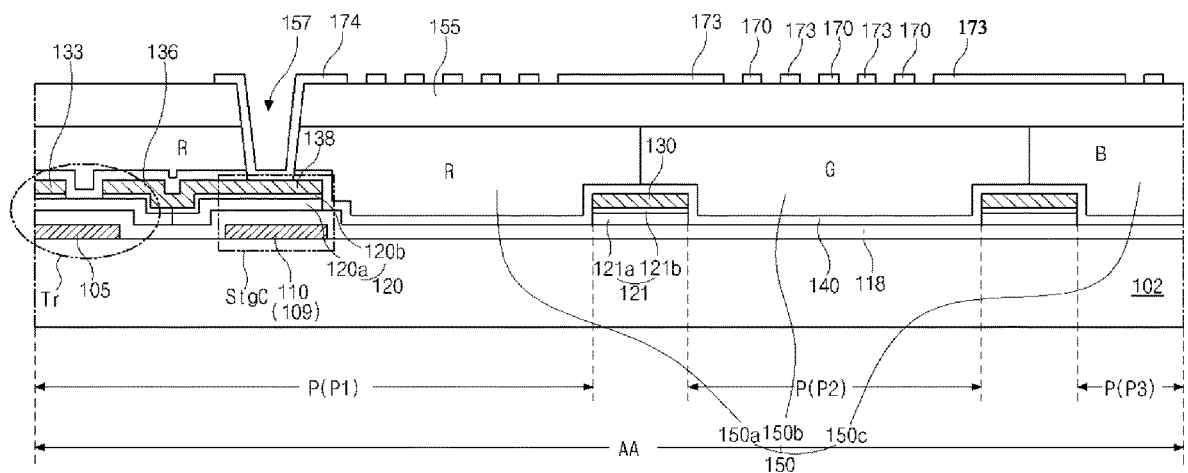
Figure 10H:
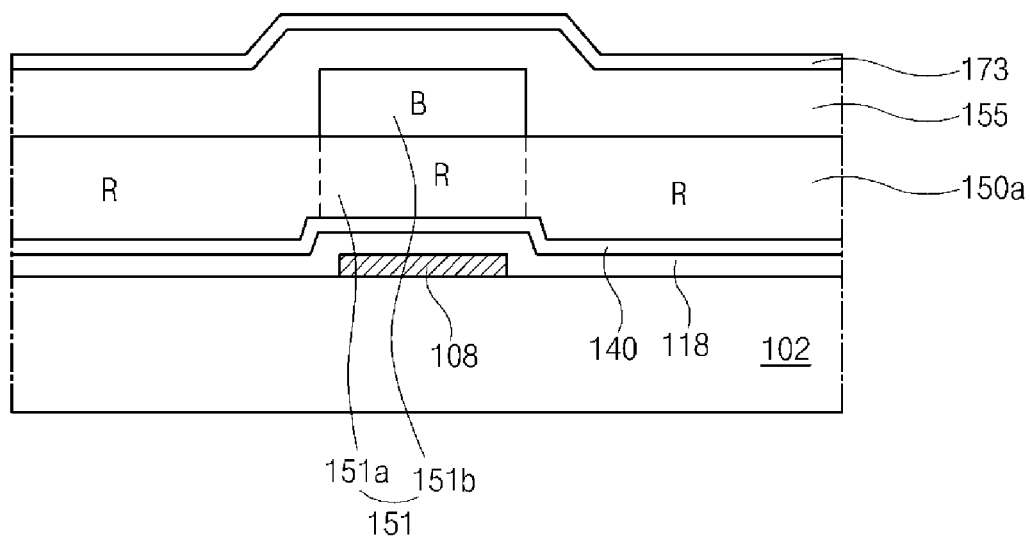

In FIGS. 9H and 10H, a conductive material layer (not shown) is formed on the planarization layer 155 having the drain contact hole 157 and the common contact hole by depositing one of a third metallic material such as molybdenum (Mo), molybdenum titanium (MoTi) and copper (Cu) and a transparent conductive material such as indium-tin-oxide (ITO) and indium-zinc-oxide (IZO).

Next, the conductive material layer is patterned through a fourth mask process to form a plurality of pixel electrodes 170, a plurality of common electrodes 173, a pixel auxiliary pattern 174 and a common auxiliary pattern in the pixel region P. The plurality of pixel electrodes 170 each having a bar shape are alternately disposed with the plurality of common electrodes 173 each having a bar shape. In addition, the pixel auxiliary pattern 174 connects the plurality of pixel electrodes 170 and is connected to the drain electrode 136 through the drain contact hole 157. Further, the common auxiliary pattern connects the plurality of common electrodes 173 and is connected to the common line 109 through the common contact hole.

The plurality of common electrodes 173 may be formed to completely cover the data line 130 which is a border between the adjacent pixel regions P to prevent light leakage through a portion adjacent the data line 130 even when a black matrix is omitted.

Next, a first alignment layer (not shown) is formed on the plurality of pixel electrodes 170 and the plurality of common electrodes 173, thereby an array substrate for the LCD device completed. The first alignment layer may cover the entire display area AA of the first substrate 102. Each of the plurality of pixel electrodes 170 and the plurality of common electrodes 173 may have a bent bar shape. The bent bar shape may have a bent portion at a center of the pixel region P to have a symmetrical structure with respect to the bent portion. In addition, the data line 130 may have a bent portion. When each of the plurality of pixel electrodes 170 and the plurality of common electrodes 173 has the bent bar shape, the pixel region P includes two domains so that color difference according to a viewing angle can be minimized.

Referring again to FIG. 4A, a plurality of first patterned spacer 196 and a plurality of second patterned spacers 197 are formed on a second substrate 194 by coating and patterning an organic material such as polyimide. The organic material may be patterned through a mask process using a single photo mask having a half-transmissive area such that plurality of first patterned spacer 196 have a first height and the plurality of second patterned spacers 197 have a second height smaller than the first height. A second alignment layer (not shown) is formed on the plurality of first patterned spacers 196 and the plurality of second patterned spacers 197, thereby a color filter substrate completed.

Referring again to FIGS. 3, 4A and 4B, after a seal pattern (not shown) is formed on an edge portion of one of the first and second substrates 102 and 194, the first and second substrates 102 and 194 are attached such that the protrusion pattern 151 contacts the plurality of first patterned spacers 196 and faces the plurality of second spacers 197, thereby the LCD device completed.

Consequently, in a liquid crystal display device according to the present disclosure, since a protrusion pattern on a first substrate corresponds to first and second patterned spacers on a second substrate, deterioration of a first alignment layer due to shift and friction of the first and second patterned spacers is limited to a protrusion portion of the first alignment layer even when a pressure is applied from exterior. Accordingly, display quality is improved.

In addition, since the protrusion pattern is formed of at least two of red, green and blue color filters, the protrusion pattern functions as a black matrix blocking a light. As a result, a light leakage through a portion adjacent to the first and second patterned spacers is prevented even when the first alignment layer is deteriorated.

Further, when the protrusion pattern has a bar shape along a data line or a gate line, the first and second substrates are attached to each other without consideration of alignment error along a direction of the protrusion pattern. Accordingly, degree of freedom in design is improved.

Moreover, since the protrusion pattern having a bar shape along the data line or the gate line blocks a light, an additional black matrix is omitted. As a result, the number of mask process is reduced and material cost is reduced so that fabrication cost can be reduced.

It will be apparent to those skilled in the art that various modifications and variations can be made in an array substrate for a liquid crystal display device of the present disclosure without departing from the spirit or scope of the invention. Thus, it is intended that the present invention covers the modifications and variations of this invention provided they come within the scope of the appended claims and their equivalents.

What is claimed is:

1. A liquid crystal display device, comprising:
first and second substrates facing and spaced apart from each other;
a gate line and a data line on an inner surface of the first substrate, the gate line and the data line crossing each other to define a pixel region;
a thin film transistor on the first substrate connected to the gate line and the data line;
a color filter layer on the thin film transistor, the color filter layer including red, green and blue color filters each corresponding to the pixel region;
a protrusion pattern on the first substrate at a boundary of the pixel region, the protrusion pattern including a first color dummy pattern and a second color dummy pattern on the first color dummy pattern which are formed of at least two of the red, green and blue color filters overlapping each other;
a pixel electrode on the color filter layer in the pixel region;
a common line parallel to and spaced apart from the gate line;
a common electrode on the first substrate parallel to and spaced apart from the pixel electrode, wherein the pixel electrode and the common electrode alternate with each other;
a first alignment layer on the pixel electrode and the common electrode, the first alignment layer including a protrusion portion protruding away from the first substrate by the protrusion pattern;
a first patterned spacer on an inner surface of the second substrate and facing the protrusion pattern, wherein the first patterned spacer contacts the first alignment layer over the protrusion pattern and the common electrode
a second alignment layer on the inner surface of the second substrate and the first patterned spacer; and
a liquid crystal layer between the first and second substrates and a backlight unit on an outer surface of the first substrate,
wherein the protrusion portion of the first alignment layer is disposed directly over the protrusion pattern,
wherein a portion of the second alignment layer on an end portion of the first patterned spacer contacts the protrusion portion of the first alignment layer and is spaced apart from other portions of the first alignment layer, wherein the protrusion pattern is disposed over a gap space between the gate line and the common line, not overlapping the data line, wherein light from the backlight unit normally incident on the first patterned spacer is blocked by the protrusion pattern and one of the gate line, the data line and the gap space before the light passes through the protrusion portion of the first alignment layer, wherein a width of the second color dummy pattern is smaller than a width of the first color dummy pattern, and wherein a width of the protrusion pattern is equal to or greater than a width of the second color dummy pattern such that the second color dummy pattern is positioned within the protrusion pattern.

2. The device according to claim 1, wherein each of the pixel electrode and the common electrode has a bar shape, wherein the pixel electrode is connected to the thin film transistor, and wherein the common electrode is connected to the common line.

3. The device according to claim 2, further comprising a planarization layer of an organic material between the color filter layer and the first alignment layer, wherein a portion of the planarization layer corresponding to the protrusion pattern protrudes from the other portion of the planarization layer.

4. The device according to claim 3, further comprising a passivation layer of an inorganic material between the thin film transistor and the color filter layer.

5. The device according to claim 4, wherein the protrusion pattern has a circular shape having a width greater than a width of the first patterned spacer.

6. The device according to claim 4, wherein the protrusion pattern has a bar shape having a width greater than a width of the first patterned spacer.

7. The device according to claim 4, wherein the planarization layer, the color filter layer and the passivation layer have a drain contact hole exposing a drain electrode of the thin film transistor, and the planarization layer, the color filter layer, the passivation layer and a gate insulating layer have a common contact hole exposing the common line, wherein the pixel electrode is connected to a pixel auxiliary pattern on the planarization layer, and the pixel auxiliary pattern is connected to the drain electrode through the drain contact hole, and wherein the common electrode is connected to a common auxiliary electrode on the planarization layer, and the common auxiliary electrode is connected to the common line through the common contact hole.

8. The device according to claim 4, wherein the common electrode completely covers the data line.

9. The device according to claim 4, further comprising a second patterned spacer on the inner surface of the second substrate, wherein the first patterned spacer has a first height, and the second patterned spacer has a second height smaller than the first height.

10. The device according to claim 1, wherein the protrusion pattern includes the first and second color dummy patterns corresponding to a border between adjacent pixel regions, and wherein the red, green and blue color filters constitute a flat top surface with the first color dummy pattern.

11. A method of fabricating a liquid crystal display device, comprising:

forming a gate line and a data line on a first substrate, the gate line and the data line crossing each other to define a pixel region;

forming a thin film transistor on the first substrate, connected to the gate line and the data line;

forming a color filter layer on the thin film transistor and a protrusion pattern on an inner surface of the first substrate at a boundary of the pixel region, the color filter layer including red, green and blue color filters each corresponding to the pixel region, the protrusion pattern including a first color dummy pattern and a second color dummy pattern on the first color dummy pattern which are formed of at least two of the red, green and blue color filters overlapping each other;

forming a pixel electrode on the color filter layer in the pixel region;

forming a common line parallel to and spaced apart from the gate line;

forming a common electrode on the first substrate parallel to and spaced apart from the pixel electrode, wherein each of the pixel electrode and the common electrode alternate with and are parallel to each other;

forming a first alignment layer on the pixel electrode and the common electrode, the first alignment layer including a protrusion portion protruding away from the first substrate by the protrusion pattern;

forming a first patterned spacer on a second substrate facing the protrusion pattern, the first patterned spacer disposed to correspond to the protrusion pattern;

forming a second alignment layer on the second substrate and the first patterned spacer;

attaching the first and second substrates such that the first patterned spacer contacts the first alignment layer over the protrusion pattern and the common electrode; and forming a liquid crystal layer between the first and second substrates and a backlight unit on an outer surface of the first substrate, wherein the protrusion portion of the first alignment layer is disposed directly over the protrusion pattern, wherein a portion of the second alignment layer on an end portion of the first patterned spacer contacts the protrusion portion of the first alignment layer and is spaced apart from other portions of the first alignment layer, wherein the protrusion pattern is formed over a gap space between the gate line and the common line, not overlapping the data line, wherein light from the backlight unit that is directed in a direction normally incident on the first patterned spacer is blocked by the protrusion pattern and one of the gate line, data line and the gap space before the light passes through a part of the protrusion portion of the first alignment layer, wherein a width of the second color dummy pattern is smaller than a width of the first color dummy pattern, and wherein a width of the protrusion pattern is equal to or greater than a width of the second color dummy pattern such that the second color dummy pattern is positioned within the protrusion pattern.

12. The method according to claim 11, wherein each of the pixel electrode and the common electrode has a bar shape, wherein the pixel electrode is connected to the thin film transistor, and wherein the common electrode is connected to the common line.

13. The method according to claim 12, further comprising:
forming a passivation layer of an inorganic material between the thin film transistor and the color filter layer; and
forming a planarization layer of an organic material between the color filter layer and the first alignment layer,
wherein a portion of the planarization layer corresponding to the protrusion pattern protrudes from the other portion of the planarization layer.

14. The method according to claim 13, wherein the protrusion pattern has a circular shape having a width greater than a width of the first patterned spacer.

15. The method according to claim 13, wherein the protrusion pattern has a bar shape having a width greater than a width of the first patterned spacer.

16. The method according to claim 13, wherein forming the color filter layer and the protrusion pattern comprises:
forming and patterning a red photoresist layer on the passivation layer to form the red color filter in the pixel region and a red color dummy pattern at the boundary of the pixel region;
forming and patterning a green photoresist layer on the red color filter to form the green color filter in the pixel region and a green color dummy pattern at the boundary of the pixel region; and
forming and patterning a blue photoresist layer on the red and green color filters to form the blue color filter in the pixel region and a blue color dummy pattern at the boundary of the pixel region,
wherein at least two of the red, green and blue color dummy pattern constitutes the protrusion pattern.

17. The method according to claim 13, wherein forming the planarization layer comprises:
forming a drain hole and a common hole in the planarization layer, the drain hole exposing the passivation layer over a drain electrode of the thin film transistor, the common hole exposing the passivation layer over the common line; and
forming a drain contact hole and a common contact hole by removing the passivation layer through the drain hole and removing the passivation layer and a gate insulating layer through the common hole, the drain contact hole exposing the drain electrode, the common contact hole exposing the common line, and
wherein forming the pixel electrode and the common electrode comprises:
forming a pixel auxiliary pattern connected to the pixel electrode and connected to the drain electrode through the drain contact hole; and
forming a common auxiliary pattern connected to the common electrode and connected to the common line through the common contact hole.

18. The method according to claim 13, wherein the common electrode completely covers the data line.

19. The method according to claim 13, further comprising forming a second patterned spacer on the inner surface of the second substrate, wherein the first patterned spacer has a first height, and the second patterned spacer has a second height smaller than the first height.

* * * * *